(12) United States Patent
Hayakawa et al.

(10) Patent No.: US 11,904,621 B2
(45) Date of Patent: Feb. 20, 2024

(54) THERMAL TRANSFER RECORDING SHEET

(71) Applicant: CANON KABUSHIKI KAISHA, Tokyo (JP)

(72) Inventors: Ai Hayakawa, Ashigarakami-gun (JP); Koromo Shirota, Kawasaki (JP); Taichi Shintou, Saitama (JP); Tsuyoshi Santo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 568 days.

(21) Appl. No.: 16/995,332

(22) Filed: Aug. 17, 2020

(65) Prior Publication Data
US 2021/0060995 A1 Mar. 4, 2021

(30) Foreign Application Priority Data

Aug. 30, 2019 (JP) ................................ 2019-158447

(51) Int. Cl.
| | | |
|---|---|---|
| *B41M 5/34* | (2006.01) | |
| *B41M 5/392* | (2006.01) | |
| *B41M 5/382* | (2006.01) | |
| *C09B 67/22* | (2006.01) | |

(52) U.S. Cl.
CPC ........ *B41M 5/345* (2013.01); *B41M 5/38228* (2013.01); *B41M 5/392* (2013.01); *C09B 67/0033* (2013.01); *B41M 2205/28* (2013.01); *B41M 2205/30* (2013.01)

(58) Field of Classification Search
CPC .. B41M 5/345; B41M 5/38228; B41M 5/392; B41M 2205/28; B41M 2205/30
See application file for complete search history.

(56) References Cited

U.S. PATENT DOCUMENTS

| | | | | |
|---|---|---|---|---|
| 5,286,706 A | * | 2/1994 | Mochizuki | ............. B41M 5/395 503/227 |
| 5,747,217 A | * | 5/1998 | Zaklika | .................. B41M 5/392 430/254 |
| 2009/0233878 A1 | | 9/2009 | Baraldi | |
| 2015/0367665 A1 | * | 12/2015 | Nakano | ................... C09B 1/325 428/32.75 |

FOREIGN PATENT DOCUMENTS

| | | | |
|---|---|---|---|
| JP | 61-179787 A | 8/1986 | |
| JP | 01152091 A | * 6/1989 | ............. B41M 5/42 |
| WO | 01/056805 A1 | 8/2001 | |

* cited by examiner

*Primary Examiner* — Gerard Higgins
(74) *Attorney, Agent, or Firm* — Canon U.S.A., Inc., IP Division

(57) ABSTRACT

A thermal transfer recording sheet including a substrate and a yellow coloring material layer, a magenta coloring material layer, and a cyan coloring material layer frame-sequentially formed on the substrate, wherein at least one of the yellow coloring material layer, the magenta coloring material layer, and the cyan coloring material layer contains a compound with a specified structure.

4 Claims, No Drawings

THERMAL TRANSFER RECORDING SHEET

This application claims the benefit of Japanese Patent Application No. 2019-158447 filed Aug. 30, 2019, which is hereby incorporated by reference herein in its entirety.

BACKGROUND OF THE INVENTION

Field of the Invention

The present disclosure relates to a thermal transfer recording sheet.

Description of the Related Art

In recent years, with the spread of 4K and 8K high-definition high-quality portable color display devices, there has been a growing demand for simple color printing of photographs taken with the devices and documents prepared with the devices. Color printing systems for use in such applications include an electrophotography system, an ink jet system, and a thermal transfer recording system. Among them, the thermal transfer recording system is advantageous as a simple printing method available in any ambient environment due to its dry printability and the portability of compact printers. There is also a demand for energy-saving image formation in portable printers for the thermal transfer recording system.

Many studies have been performed on thermal transfer sheets for use in the thermal transfer recording system. For example, a thermal transfer sheet that contains thermoplastic molecules and a water-soluble polymer in an ink layer to improve the wear resistance and uniformity of transfer images is proposed (Japanese Patent Laid-Open No. 01-152091). A thermal recording medium that contains a higher fatty acid, higher alcohol, fat or oil, or wax in an adhesive layer to prevent nonuniformity in transfer images is also proposed (Japanese Patent Laid-Open No. 61-179787).

It is known in the thermal transfer recording system that color mixing to record yellow, magenta, and cyan causes catalytic fading between dyes. Thus, even using monochromatic dyes with high light fastness, due to a difference in light fastness between the colors, for example, only cyan fades in a black image region, and the image becomes reddish or yellowish. The difference in the degree of fading between colors in images is referred to as "imbalance". The almost same degree of fading in all colors is referred to as "good imbalance", and fading of a particular color is referred to as "poor imbalance".

The disclosure of the above Japanese Unexamined Patent Application Publications do not refer to the imbalance improving effect. Thus, there is a demand for a thermal transfer recording sheet with improved imbalance.

SUMMARY OF THE INVENTION

Accordingly, the present disclosure provides a thermal transfer recording sheet that can form a high-density image with improved imbalance and long-term storage stability even at low energy.

The present disclosure provides a thermal transfer recording sheet including a substrate and a yellow coloring material layer containing a yellow dye, a magenta coloring material layer containing a magenta dye, and a cyan coloring material layer containing a cyan dye frame-sequentially formed on the substrate, wherein at least one coloring material layer selected from the group consisting of the yellow coloring material layer, the magenta coloring material layer, and the cyan coloring material layer contains at least one compound selected from a compound group represented by the following formulae (1) to (3), and a content of the compound contained in a coloring material layer A, which is the at least one coloring material layer containing the compound, ranges from 5 to 25 parts by mass per 100 parts by mass of dye contained in the coloring material layer A,

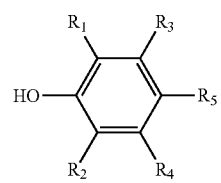

formula (1)

in the formula (1), $R_1$ denotes a hydrogen atom, an alkyl group having 1 to 4 carbon atoms, or a hydroxy group, $R_2$ to $R_4$ independently denote a hydrogen atom or an alkyl group having 1 to 4 carbon atoms, and $R_5$ denotes an alkyl group having 1 to 4 carbon atoms, a hydroxymethyl group, or an amino group,

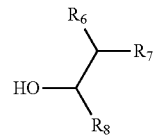

formula (2)

in the formula (2), $R_6$ denotes an alkyl group having 5 to 23 carbon atoms or a hydroxyalkyl group having 5 to 23 carbon atoms, $R_7$ denotes a hydrogen atom, a hydroxy group, or a hydroxymethyl group, and $R_8$ denotes a hydrogen atom or an alkyl group having 5 to 23 carbon atoms,

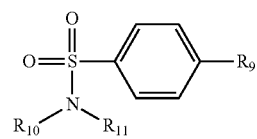

formula (3)

in the formula (3), $R_9$ denotes an alkyl group having 1 to 4 carbon atoms or an amino group, $R_{10}$ denotes a hydrogen atom or an alkyl group having 1 to 8 carbon atoms, and $R_{11}$ denotes an alkyl group having 1 to 8 carbon atoms.

Further features of the present disclosure will become apparent from the following description of exemplary embodiments.

DESCRIPTION OF THE EMBODIMENTS

The present disclosure is described in detail below.

As a result of extensive studies to solve the above disadvantages, the present inventors found that the following thermal transfer recording sheet can produce an image with high density, good imbalance, and high long-term storage stability under low-energy conditions.

A thermal transfer recording sheet according to the present disclosure includes at least a substrate and a yellow coloring material layer, a magenta coloring material layer, and a cyan coloring material layer on the substrate. These coloring material layers contain their respective coloring materials. At least one of these coloring material layers contains a compound selected from the compound group represented by the general formulae (1) to (3) (hereinafter referred to as a "first compound").

Although the mechanism by which the first compound represented by one of the general formulae (1) to (3) produces its effects is not clear, the following is a possible reason for that.

The first compound and a coloring material moving into a receiving layer due to an interaction caused by a hydrogen bond between the first compound and the coloring material may have some influence. Enhanced heat transfer of the coloring material due to the plasticization effects of the first compound and a resin in an ink layer may also have some influence. Furthermore, it is supposed that the presence of the compound represented by one of the general formulae (1) to (3) in the vicinity of the coloring material that has moved into the receiving layer suppresses the decomposition of the coloring material, increases the optical density of a black image, and provides an image with good imbalance and high storage stability.

A thermal transfer recording sheet according to the present disclosure is further described below.

(I) Thermal Transfer Recording Sheet

As described above, a thermal transfer recording sheet according to the present disclosure includes a substrate and a yellow coloring material layer, a magenta coloring material layer, and a cyan coloring material layer frame-sequentially formed on the substrate. At least one of these coloring material layers contains a compound selected from the compound group represented by the general formulae (1) to (3).

The yellow coloring material layer can contain a compound selected from a compound group represented by the general formulae (4) to (7) and (18). The cyan coloring material layer can contain a compound selected from a compound group represented by the general formulae (8) to (11). The magenta coloring material layer can contain a compound selected from a compound group represented by the general formulae (12) to (17).

The thermal transfer recording sheet may include a transferable protective layer in addition to the coloring material layers.

The structure of the thermal transfer recording sheet is described in detail below.

(I-1) Substrate

The substrate of the thermal transfer recording sheet supports at least the three coloring material layers. The substrate may be, but is not limited to, a substrate that is known in the field of thermal transfer recording sheets and that has moderate heat resistance and strength.

For example, the substrate is a poly(ethylene terephthalate) film, a poly(ethylene naphthalate) film, a polycarbonate film, a polyimide film, a polyamide film, an aramid film, a polystyrene film, a 1,4-poly(cyclohexylene dimethylene terephthalate) film, a polysulfone film, a polypropylene film, a poly(phenylene sulfide) film, a poly(vinyl alcohol) film, a cellophane film, a cellulose derivative film, a polyethylene film, a poly(vinyl chloride) film, a nylon film, capacitor paper, or paraffin paper. Among these, poly(ethylene terephthalate) films have high mechanical strength, solvent resistance, and economic efficiency.

Thickness of Substrate

The substrate may have a thickness of 0.5 μm or more and 50 μm or less, preferably 3 μm or more and 10 μm or less in terms of transferability.

Adhesive Treatment

In the application of a composition containing a dye (ink) to form each coloring material layer on the substrate, the coating liquid (dye composition) may have insufficient wettability and adhesiveness. Thus, the coating surface of the substrate can be subjected to adhesive treatment, if necessary.

The adhesive treatment may be, but is not limited to, a method known in the field of thermal transfer recording sheets. For example, the adhesive treatment is ozone treatment, corona discharge treatment, ultraviolet light treatment, plasma treatment, low-temperature plasma treatment, primer treatment, or chemical treatment. These treatments may be used in combination.

For the adhesive treatment of the substrate, an adhesive layer may be formed on the substrate. The adhesive layer may be, but is not limited to, an adhesive layer known in the field of thermal transfer recording sheets. The material of the adhesive layer may be an organic material, such as polyester resin, polystyrene resin, polyacrylate resin, polyamide resin, polyether resin, poly(vinyl acetate) resin, polyethylene resin, polypropylene resin, poly(vinyl chloride) resin, poly(vinyl alcohol) resin, or poly(vinyl butyral) resin, or inorganic fine particles, such as silica, alumina, magnesium carbonate, magnesium oxide, or titanium oxide.

Heat-Resistant Slipping Layer

To improve heat resistance and the traveling performance of a thermal head, a heat-resistant slipping layer can be formed on a surface of the substrate opposite the coloring material layers.

The heat-resistant slipping layer contains a heat-resistant resin. The heat-resistant resin may be, but is not limited to, the following resin: poly(vinyl butyral) resin, poly(vinyl acetal) resin, polyester resin, polyether resin, polybutadiene resin, vinyl chloride-vinyl acetate copolymer resin, styrene-butadiene copolymer resin, polyurethane acrylate, polyester acrylate, polyimide resin, or polycarbonate resin.

The heat-resistant slipping layer may contain an additive agent, such as a crosslinking agent, a release agent, a lubricant, and/or a slip additive. The lubricant may be an amino-modified silicone compound or a carboxy-modified silicone compound. The slip additive may be fine particles, such as heat-resistant fine particles, for example, silica.

The heat-resistant slipping layer can be formed by dissolving or dispersing the heat-resistant resin and the additive agent in a solvent to prepare a heat-resistant slipping layer coating liquid, applying the coating liquid to the substrate, and drying the coating liquid. The heat-resistant slipping layer coating liquid may be applied by any method, for example, by using a bar coater, a gravure coater, a reverse roll coater, a rod coater, or an air doctor coater. The thickness can be easily adjusted by a coating method using a gravure coater.

The amount of heat-resistant slipping layer coating liquid to be applied to the substrate can be such that the thickness of the heat-resistant slipping layer after drying is 0.1 μm or more and 5 μm or less in terms of transferability.

(I-2-1) Coloring Material Layer

The thermal transfer recording sheet at least includes three frame-sequentially formed coloring material layers including a yellow coloring material layer, a magenta coloring material layer, and a cyan coloring material layer. At least one of these three coloring material layers contains at least one compound selected from the compound group represented by the general formulae (1) to (3).

The coloring material layer containing the compound represented by one of the general formulae (1) to (3) can be the cyan coloring material layer or the magenta coloring material layer or can be the cyan coloring material layer. In general, coloring materials excited by light are susceptible to oxidation, and the energy level decreases in the order of yellow, magenta, and cyan. The excitation energy shifts from an unstable state with high excitation energy (yellow) to a stable state with low excitation energy (cyan). Consequently, cyan coloring materials are most easily decomposed. The compound represented by one of the general formulae (1) to (3) in the coloring material layer converts light excitation energy to thermal or vibrational energy and suppresses the decomposition of the coloring material. The compound represented by one of the general formulae (1) to (3) in the most degradable cyan layer promotes conversion to thermal or vibrational energy and stabilizes the coloring material. This can suppress the decomposition of the coloring material in the coloring material layer, increase the optical density of a black image, and provide an image with good imbalance and high storage stability. Thus, only the cyan coloring material layer can contain the compound represented by one of the general formulae (1) to (3).

The thermal transfer recording sheet can contain a compound represented by one of the general formulae (4) to (7) and (18) as a yellow dye, a compound represented by one of the general formulae (8) to (11) as a cyan dye, and a compound represented by one of the general formulae (12) to (17) as a magenta dye.

Each color dye may be any thermal transfer dye that is transferable by heat known in the field of thermal transfer recording sheets and can be used in combination with the above coloring materials.

The content of the compound contained in a coloring material layer A, which contains the compound represented by one of the general formulae (1) to (3), ranges from 5 to 25 parts by mass per 100 parts by mass of dye contained in the coloring material layer A. A content of the compound in this range results in an image with particularly good imbalance and long-term storage stability. The content of the compound preferably ranges from 8 to 20 parts by mass, particularly preferably 8 to 15 parts by mass, per 100 parts by mass of dye contained in the coloring material layer A.

(I-2-2) Components in Coloring Material Layers

Each component in the coloring material layers is described below.

(i) First Compound

First, the first compound represented by one of the general formulae (1) to (3) is described below. The first compound is not limited to of one type and may be composed of at least two compounds. For example, the first compound may be composed of two or more compounds represented by the general formula (1), may be composed of two or more compounds represented by the general formula (2), or may be composed of one or more compounds represented by the general formula (1), one or more compounds represented by the general formula (2), and one or more compounds represented by the general formula (3).

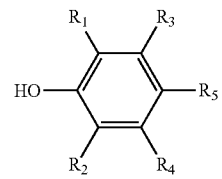

formula (1)

In the general formula (1), $R_1$ denotes a hydrogen atom, an alkyl group having 1 to 4 carbon atoms, or a hydroxy group, $R_2$ to $R_4$ independently denote a hydrogen atom or an alkyl group having 1 to 4 carbon atoms, and $R_5$ denotes an alkyl group having 1 to 4 carbon atoms, a hydroxymethyl group, or an amino group.

In the general formula (1), more specifically, the alkyl group having 1 to 4 carbon atoms in $R_1$ to $R_5$ may be a methyl group, an ethyl group, a n-propyl group, an iso-propyl group, a n-butyl group, a sec-butyl group, a tert-butyl group, or an iso-butyl group.

When $R_1$ to $R_5$ are alkyl groups having 1 to 4 carbon atoms, an image with high density, good imbalance, and high long-term storage stability under low-energy conditions can be produced.

In the general formula (1), $R_1$ and $R_2$ can denote the same substituent, and $R_3$ and $R_4$ can denote the same substituent. In such a case, an image with high density, good imbalance, and high long-term storage stability under low-energy conditions can be produced.

Specific examples of the compound represented by the general formula (1) include, but are not limited to, the following compounds (A1) to (A23).

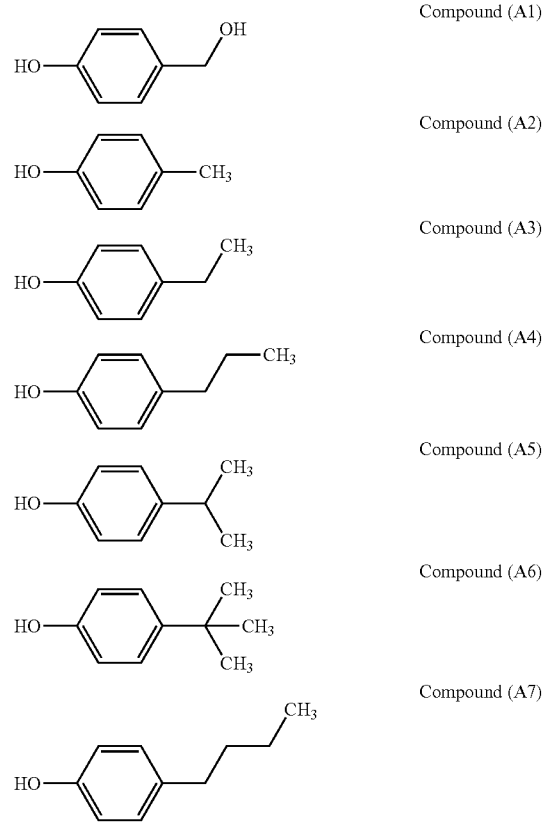

Compound (A8)
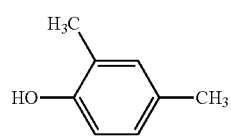
Compound (A9)
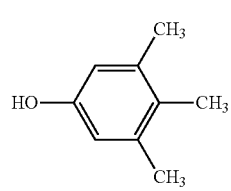
Compound (A10)
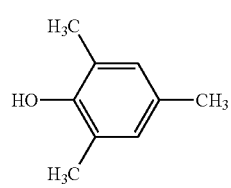
Compound (A11)
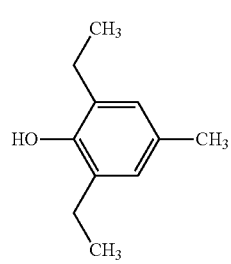
Compound (A12)
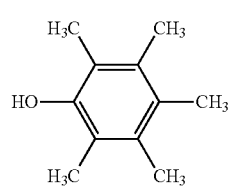
Compound (A13)
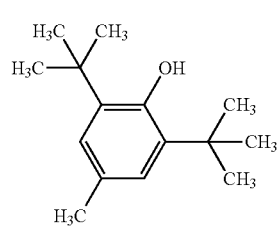
Compound (A14)
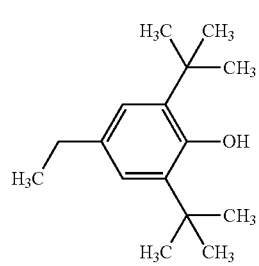
Compound (A15)
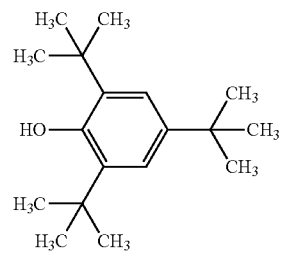
Compound (A16)
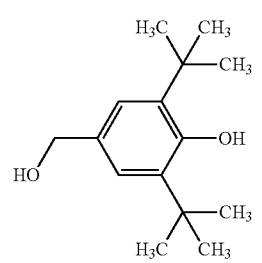
Compound (A17)
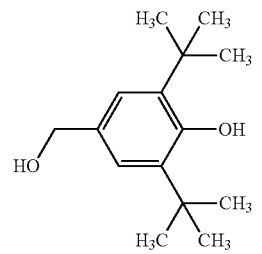
Compound (A18)
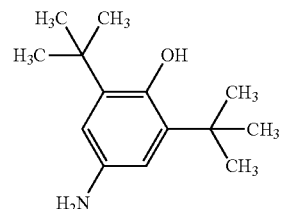
Compound (A19)
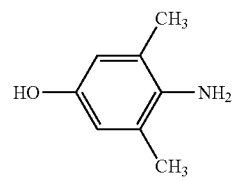
Compound (A20)
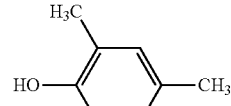
Compound (A21)
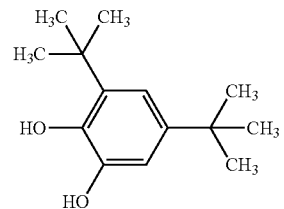
Compound (A22)
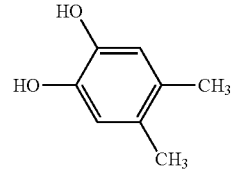
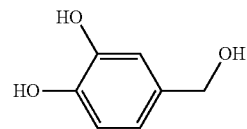

-continued

Compound (A23)

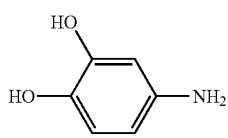

The compound represented by the general formula (1) preferably has a melting point in the range of 40° C. to 200° C., more preferably 50° C. to 180° C., particularly preferably 60° C. to 150° C., in terms of transferability and storage stability.

formula (2)

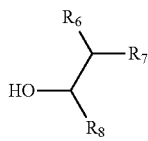

In the general formula (2), $R_6$ denotes an alkyl or hydroxyalkyl group having 5 to 23 carbon atoms, $R_7$ denotes a hydrogen atom, a hydroxy group, or a hydroxymethyl group, and $R_8$ denotes a hydrogen atom or an alkyl group having 5 to 23 carbon atoms.

In the general formula (2), more specifically, the alkyl group having 5 to 23 carbon atoms in $R_6$ and $R_8$ may be a pentyl group, a 2-ethylpropyl group, a cyclopentyl group, a hexyl group, a cyclohexyl group, a heptyl group, an octyl group, a 2-ethylhexyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, an icosyl group, a henicosyl group, a docosyl group, or a tricosyl group.

When $R_6$ is an alkyl group having 5 to 20 carbon atoms, an image with high density, good imbalance, and high long-term storage stability under low-energy conditions can be produced.

In the general formula (2), more specifically, the hydroxyalkyl group having 5 to 23 carbon atoms in $R_6$ may be a 1-hydroxypentyl group, a 1-hydroxy 2-ethylpropyl group, a 1-hydroxyhexyl group, a 1-hydroxyheptyl group, a 1-hydroxyoctyl group, a 1-hydroxy-2-ethylhexyl group, a 2-hydroxy-2-ethylhexyl group, a 1-hydroxynonyl group, a 1-hydroxydecyl group, a 1-hydroxyundecyl group, a 1-hydroxydodecyl group, a 1-hydroxytridecyl group, a 1-hydroxytetradecyl group, a 1-hydroxypentadecyl group, a 1-hydroxyhexadecyl group, a 1-hydroxyheptadecyl group, a 1-hydroxyoctadecyl group, a 1-hydroxynonadecyl group, a 1-hydroxyicosyl group, a 1-hydroxyhenicosyl group, a 1-hydroxydocosyl group, or a 1-hydroxytricosyl group.

Specific examples of the compound represented by the general formula (2) include, but are not limited to, the following compounds (B1) to (B27).

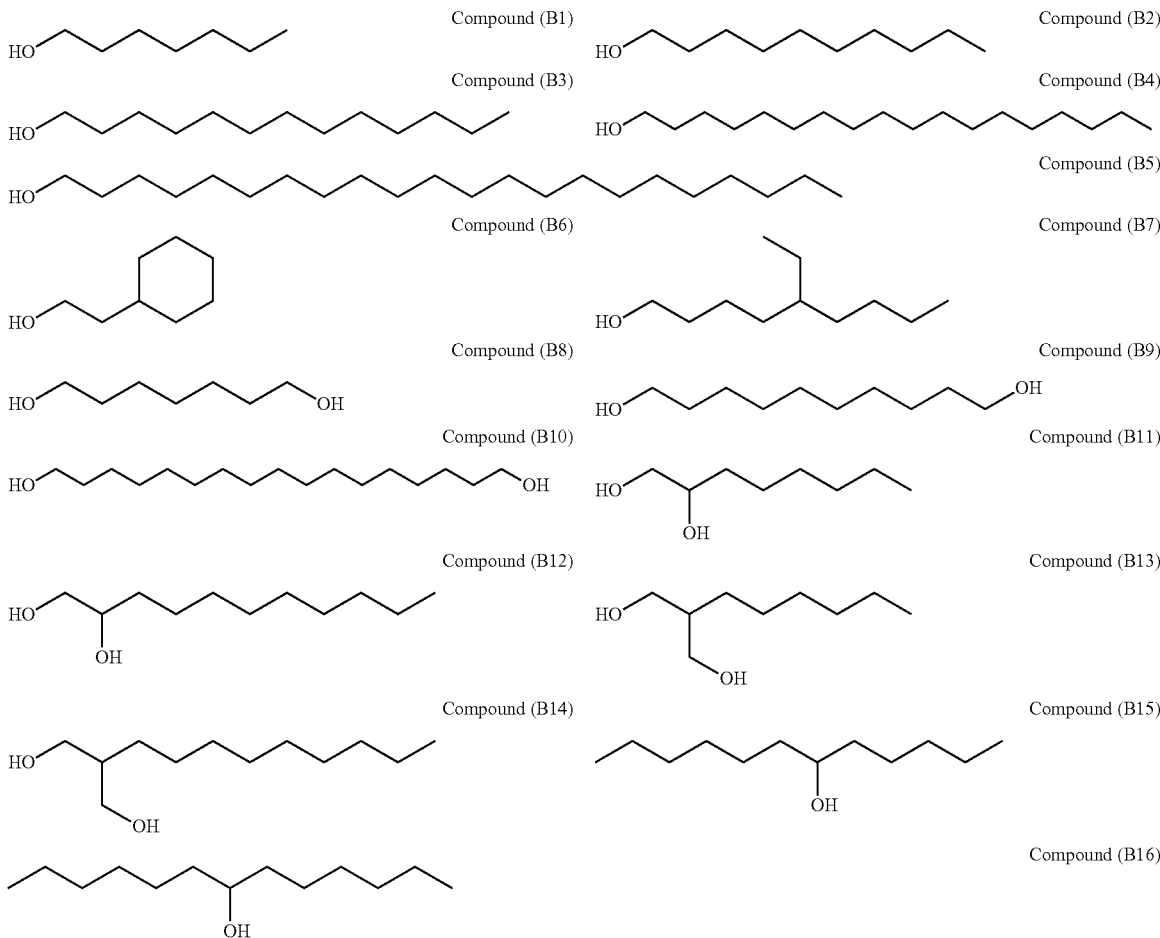

-continued

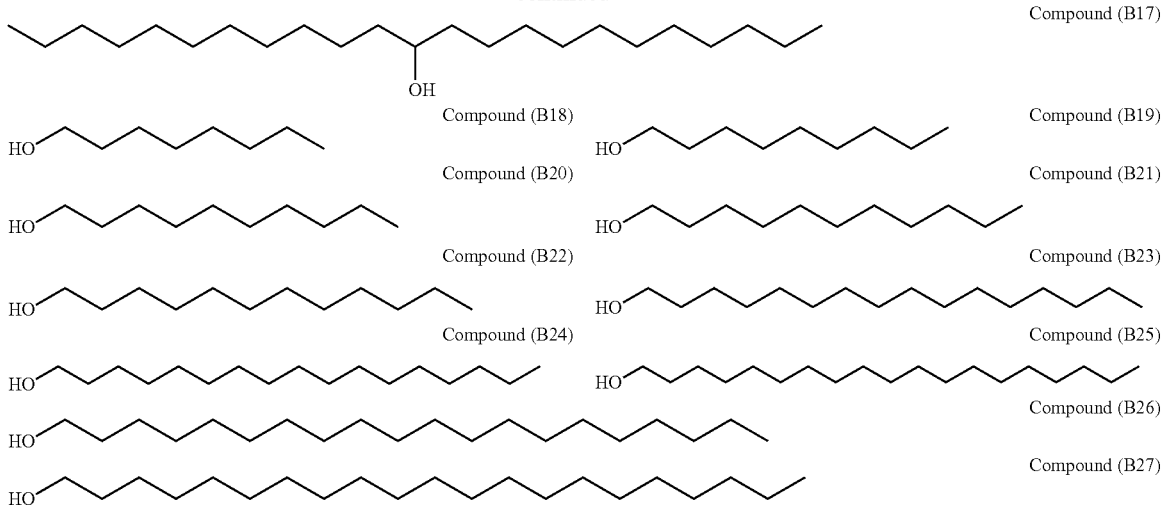

The compound represented by the general formula (2) preferably has a melting point in the range of 0° C. to 100° C., more preferably 10° C. to 90° C., particularly preferably 20° C. to 80° C., in terms of transferability and storage stability.

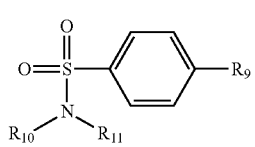

formula (3)

In the general formula (3), $R_9$ denotes an alkyl group having 1 to 4 carbon atoms or an amino group, $R_{10}$ denotes a hydrogen atom or an alkyl group having 1 to 8 carbon atoms, and $R_{11}$ denotes an alkyl group having 1 to 8 carbon atoms.

In the general formula (3), more specifically, the alkyl group having 1 to 4 carbon atoms in $R_9$ may be a methyl group, an ethyl group, a n-propyl group, an iso-propyl group, a n-butyl group, a sec-butyl group, a tert-butyl group, or an iso-butyl group. When $R_9$ is a methyl group or an amino group, an image with high density, good imbalance, and high long-term storage stability under low-energy conditions can be produced.

In the general formula (3), more specifically, the alkyl group having 1 to 8 carbon atoms in $R_{10}$ and $R_{11}$ may be a methyl group, an ethyl group, a n-propyl group, an iso-propyl group, a n-butyl group, a sec-butyl group, a tert-butyl group, an iso-butyl group, a pentyl group, a 2-ethylpropyl group, a cyclopentyl group, a hexyl group, a cyclohexyl group, a heptyl group, an octyl group, or a 2-ethylhexyl group.

Specific examples of the compound represented by the general formula (3) include, but are not limited to, the following compounds (C1) to (C21).

Compound (C1)

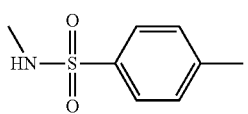

-continued

Compound (C2)

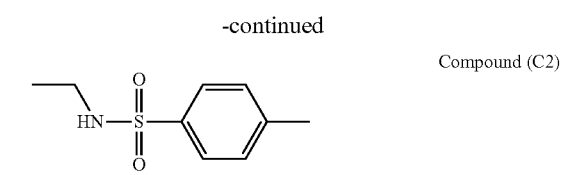

Compound (C3)

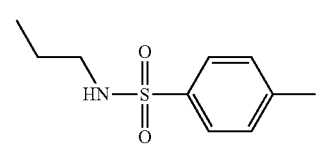

Compound (C4)

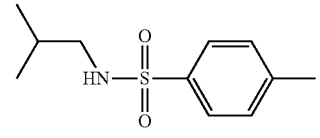

Compound (C5)

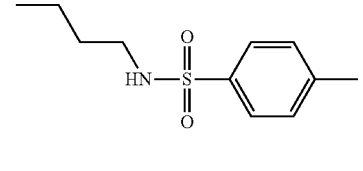

Compound (C6)

Compound (C7)

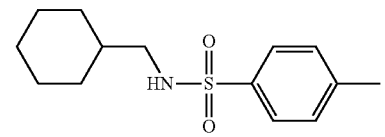

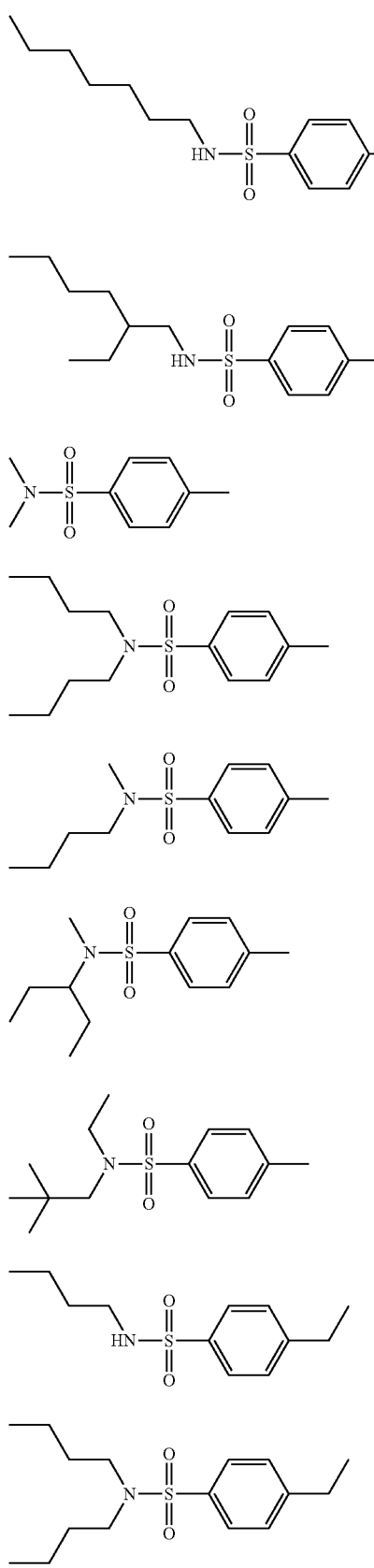
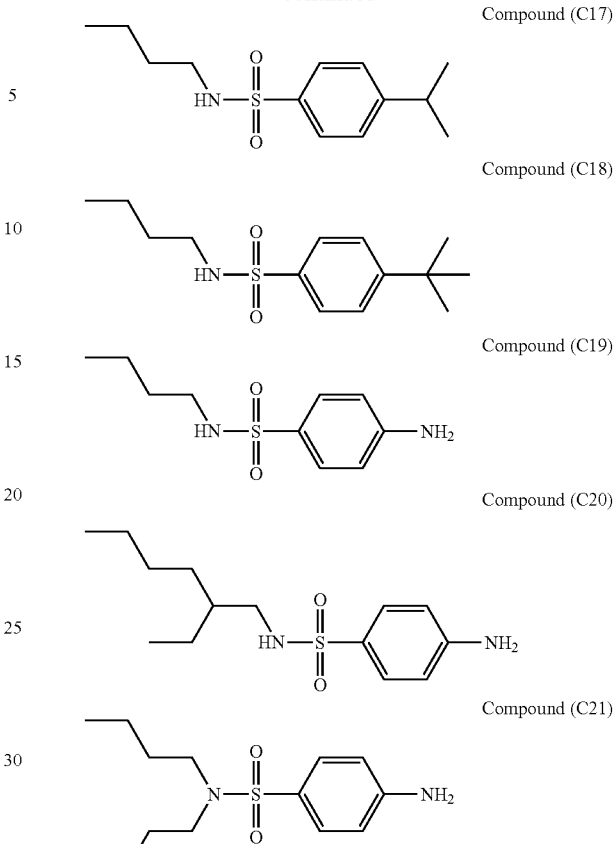

The compound represented by the general formula (3) preferably has a melting point in the range of 40° C. to 200° C., more preferably 50° C. to 180° C., particularly preferably 60° C. to 150° C., in terms of transferability and storage stability.

The first compound can be (A8), (A9), (A10), (A13), (A14), (A16), (A18), (A20), (B2), (B3), (B4), (B5), (B9), (B11), (B14), (B16), (B22), (B23), (B24), (B25), (B26), (B27), (C5), or (C20) of the above compounds. In particular, to convert light excitation energy to thermal or vibrational energy and suppress the decomposition of coloring materials and to produce an image with high density, good imbalance, and high long-term storage stability under low-energy conditions, the first compound can be (A8), (A9), (A10), (A16), (A18), (A20), (B4), (B5), (B22), (B23), (B24), (B25), (B26), or (B27).

The first compound represented by one of the general formulae (1) and (2) is easily available from Tokyo Chemical Industry Co., Ltd., for example. When $R_9$ in the general formula (3) is an alkyl group, the first compound can be synthesized with reference to a known method. More specifically, the first compound can be produced by the following method, for example. The first compound can be produced by a reaction between a 4-alkylbenzene sulfonyl chloride and an alkylamine under basic conditions. When $R_9$ is an amino group, the first compound can be synthesized with reference to a known method described in U.S. Patent Application Publication No. 2009/0233878.

(ii) Yellow Dye (Compound Represented by One of General Formulae (4) to (7) and (18))

The thermal transfer recording sheet contains at least one selected from a compound group represented by the general formulae (4) to (7) and (18) as a yellow coloring material (yellow dye) in the yellow coloring material layer. The yellow coloring material may be composed of one or two or more of these compounds.

(ii-1) Compound Represented by General Formula (4)

First, the compound represented by the general formula (4) (yellow dye) is described below.

formula (4)

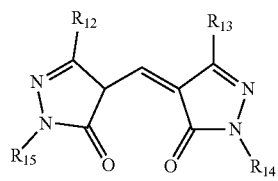

In the general formula (4), $R_{12}$ to $R_{15}$ independently denote an alkyl group, an unsubstituted aryl group, or an aryl group with a substituent.

In the general formula (4), the alkyl group in $R_{12}$ to $R_{15}$ may be a linear, branched, or cyclic, primary, secondary, or tertiary alkyl group having 1 to 20 carbon atoms. More specifically, the alkyl group may be a methyl group, an ethyl group, a n-propyl group, an iso-propyl group, a n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, or a 2-ethylhexyl group. Among these alkyl groups, an alkyl group having 1 or more and 4 or less carbon atoms can result in an image with high density, good imbalance, and high long-term storage stability under low-energy conditions.

In the general formula (4), the aryl group in $R_{12}$ to $R_{15}$ may be a phenyl group or a naphthyl group. The substituent in the aryl group with the substituent may be an alkyl group. The aryl group with the substituent may be a tolyl group (a 2-methylphenyl group, a 3-methylphenyl group, or a 4-methylphenyl group). The total number of carbon atoms in the aryl group (including the number of carbon atoms in the substituent) may be 6 or more and 10 or less.

Among these aryl groups, a phenyl group can result in an image with high density, good imbalance, and high long-term storage stability under low-energy conditions.

Specific examples of the compound represented by the general formula (4) include, but are not limited to, the following compounds (4-1) to (4-8).

Compound (4-1)

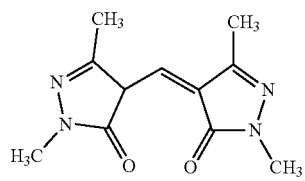

Compound (4-2)

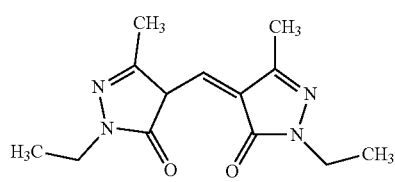

Compound (4-3)

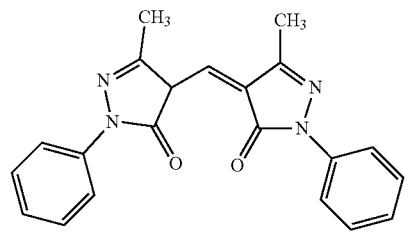

Compound (4-4)

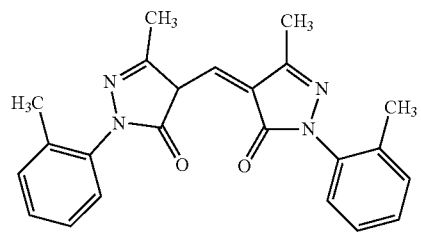

Compound (4-5)

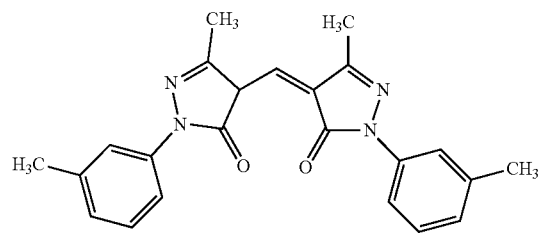

Compound (4-6)

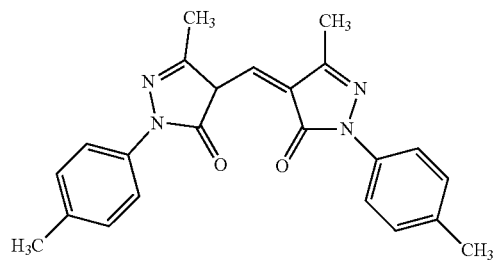

Compound (4-7)

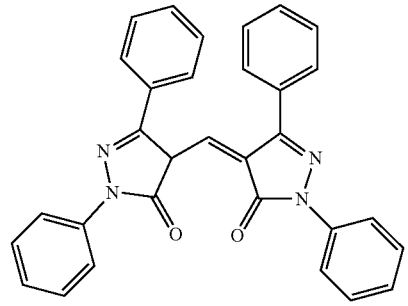

-continued

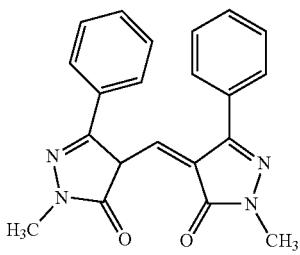

Compound (4-8)

The compound represented by the general formula (4) can be at least one of the compounds (4-3) to (4-6). The use of the compound (4-3) as the compound represented by the general formula (4) can produce an image with high density, good imbalance, and high long-term storage stability under low-energy conditions.

(ii-2) Compound Represented by General Formula (5)

The compound represented by the general formula (5) (yellow dye) is described below.

formula (5)

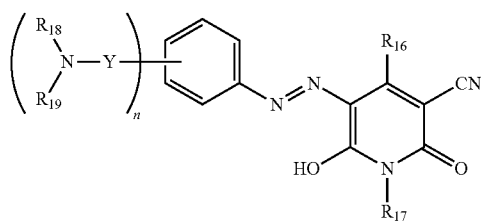

In the general formula (5), $R_{16}$ denotes an alkyl group, an unsubstituted aryl group, an aryl group with a substituent, an unsubstituted amino group, or an amino group with a substituent.

$R_{17}$ denotes a hydrogen atom (—H: a hydrogen group), an alkyl group, an unsubstituted aryl group, an aryl group with a substituent, or —N(—$R_a$)$R_b$.

$R_a$ and $R_b$ satisfy the following (i) or (ii). (i) $R_a$ and $R_b$ independently denote a hydrogen atom, an alkyl group, or an acyl group. (ii) $R_a$ and $R_b$ are bonded together and form a ring, and $R_a$ and $R_b$ denote an atomic group required to form the ring.

$R_{18}$ denotes an alkyl group.

$R_{19}$ denotes a hydrogen atom or an alkyl group.

Y denotes a carbonyl group (—C(=O)—) or a sulfonyl group (—S(=O)$_2$—). n denotes an integer in the range of 1 to 3.

In the general formula (5), the alkyl group in $R_{16}$ may be a linear or branched alkyl group having 1 to 4 carbon atoms, such as a methyl group, an ethyl group, a propyl group, or a butyl group.

In the general formula (5), the aryl group in $R_{16}$ may be a phenyl group. The substituent in the aryl group with the substituent may be an alkyl group. The aryl group with the substituent may be a tolyl group (a 2-methylphenyl group, a 3-methylphenyl group, or a 4-methylphenyl group). The total number of carbon atoms in the aryl group (including the number of carbon atoms in the substituent) may range from 6 to 12.

In the general formula (5), the amino group in $R_{16}$ may be unsubstituted (—$NH_2$) or substituted (—NHRc or —NRcRd (Rc and Rd denote a substituent)). The substituent may be an alkyl group, such as a methyl group or an ethyl group. The amino group with the substituent may be a monomethylamino group, a dimethylamino group, or a diethylamino group.

Among these, the alkyl group in $R_{16}$ tends to result in an image with high density, good imbalance, and high long-term storage stability under low-energy conditions. Likewise, $R_{16}$ can be a methyl group.

In the general formula (5), the alkyl group in $R_{17}$ may be a linear, branched, or cyclic, primary, secondary, or tertiary alkyl group having 1 to 20 carbon atoms. More specifically, the alkyl group may be a methyl group, an ethyl group, a n-propyl group, an iso-propyl group, a n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, or a 2-ethylhexyl group. Among these alkyl groups, a methyl group, an ethyl group, a n-propyl group, an iso-propyl group, a n-butyl group, and a 2-ethylhexyl group tends to result in an image with high density, good imbalance, and high long-term storage stability under low-energy conditions. From the same perspective, the alkyl group can be an ethyl group or a n-propyl group.

In the general formula (5), the aryl group in $R_{17}$ may be the same as in $R_{16}$ in the general formula (5).

In the general formula (5), when $R_{17}$ denotes —N(—$R_a$)$R_b$, the alkyl group in $R_a$ and $R_b$ may be the same as in $R_{17}$ in the general formula (5).

In the general formula (5), when $R_{17}$ denotes —N(—$R_a$)$R_b$, the acyl group in $R_a$ and $R_b$ may be an alkyl carbonyl group, such as an acetyl group or an ethyl hexynoyl group, or an aryl carbonyl group, such as a benzoyl group.

In the general formula (5), when $R_{17}$ denotes —N(—$R_a$)$R_b$, and $R_a$ and $R_b$ are bonded together and form a ring, the ring may be a pyrrolidine ring, a piperidine ring, an azepane ring, or an azocane ring, in order to produce an image with high density, good imbalance, and high long-term storage stability under low-energy conditions.

In particular, when at least one of $R_a$ and $R_b$ is an alkyl group, an image with high density, good imbalance, and high long-term storage stability under low-energy conditions can be produced. From the same perspective, at least one of $R_a$ and $R_b$ can be a methyl group.

In the general formula (5), the alkyl group in $R_{18}$ and $R_{19}$ may be the same as in $R_{17}$ in the general formula (5).

In particular, $R_{18}$ and $R_{19}$ can independently denote an ethyl group, a n-butyl group, a sec-butyl group, a dodecyl group, a cyclohexyl group, a methylcyclohexyl group, a 2-ethylpropyl group, or a 2-ethylhexyl group, or a n-butyl group or a 2-ethylhexyl group, in order to produce an image with high density, good imbalance, and high long-term storage stability under low-energy conditions. When $R_{15}$ and $R_{16}$ are the same alkyl group, an image with high density, good imbalance, and high long-term storage stability under low-energy conditions can be produced.

In the general formula (5), Y denotes a carbonyl group or a sulfonyl group. When Y denotes a carbonyl group, an image with high density, good imbalance, and high long-term storage stability under low-energy conditions can be produced.

In the general formula (5), n denotes an integer in the range of 1 to 3. When n is 1, an image with high light fastness and improved imbalance can be easily produced.

Although an azo form is described in the general formula (5), a hydrazo tautomer is also within the scope of the present disclosure.

In the general formula (5), the $R_{18}(R_{19}-)N-Y-$ group may bind to any position on the phenyl group.

Specific examples of the compound represented by the general formula (5) include, but are not limited to, the following compounds (5-1) to (5-5).

Compound (5-1)

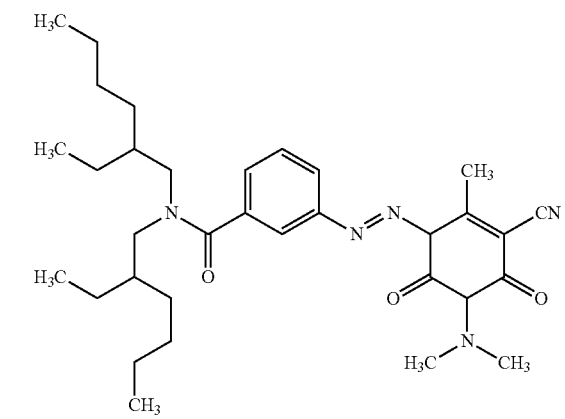

Compound (5-2)

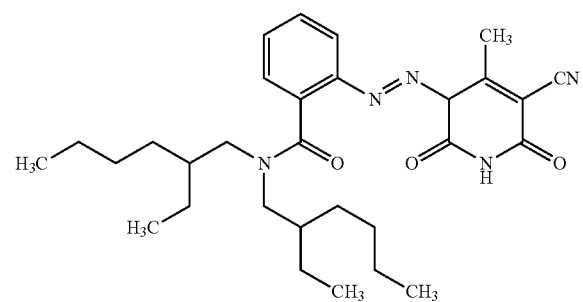

Compound (5-3)

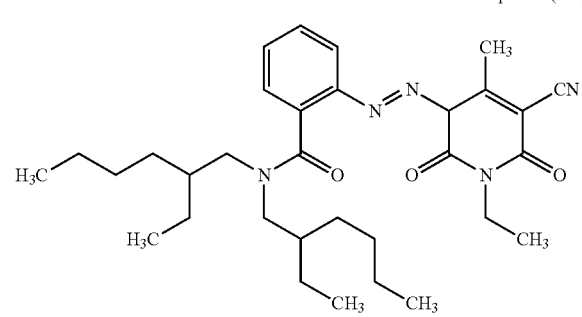

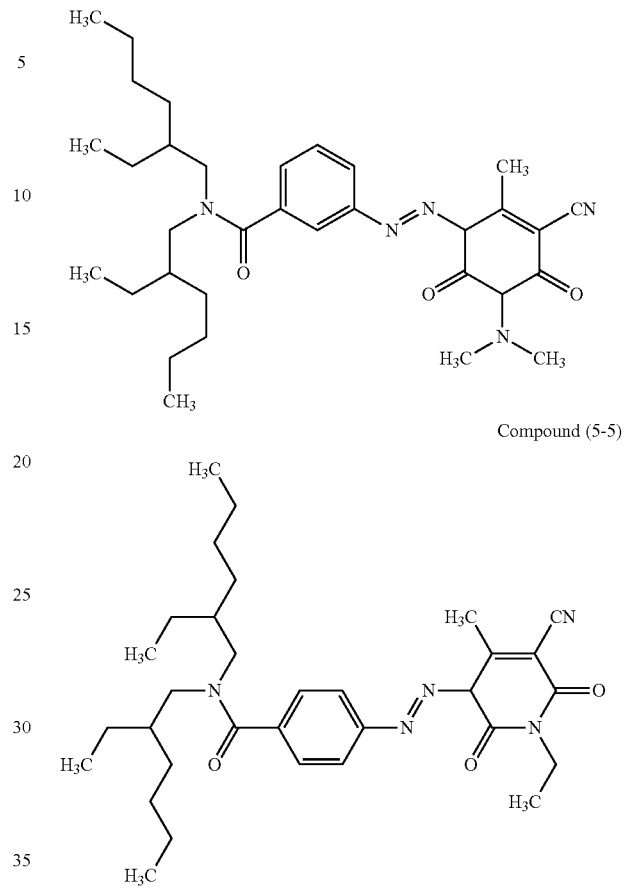

Compound (5-4)

Compound (5-5)

The use of at least one of the compounds (5-3) to (5-5) as the compound represented by the general formula (5) can produce an image with high density, good imbalance, and high long-term storage stability under low-energy conditions.

(ii-3) Compound Represented by General Formula (6)

The compound represented by the general formula (6) (yellow dye) is described below.

formula (6)

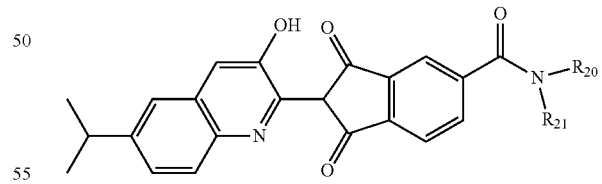

In the general formula (6), $R_{20}$ and $R_{21}$ independently denote an alkyl group or an aryl group.

In the general formula (6), the alkyl group in $R_{20}$ and $R_{21}$ may be the same as in $R_{17}$ in the general formula (5). Among these alkyl groups, a linear or branched alkyl group having 1 to 8 carbon atoms (for example, a propyl group, a butyl group, or a 2-ethylhexyl group) can result in an image with high density, good imbalance, and high long-term storage stability under low-energy conditions. From the perspective of light fastness and imbalance, both $R_{20}$ and $R_{21}$ can be a butyl group.

In the general formula (6), the aryl group in $R_{20}$ and $R_{21}$ may be a phenyl group or a naphthyl group. Among these aryl groups, a phenyl can result in an image with high density, good imbalance, and high long-term storage stability under low-energy conditions.

Specific examples of the compound represented by the general formula (6) include, but are not limited to, the following compounds (6-1) to (6-6).

Compound (6-1)

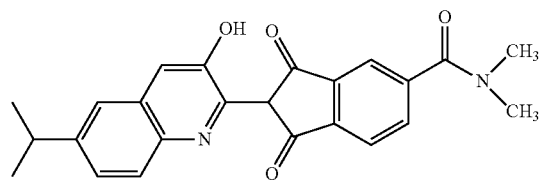

Compound (6-2)

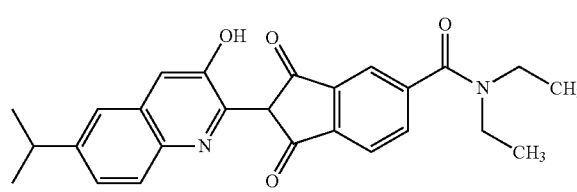

Compound (6-3)

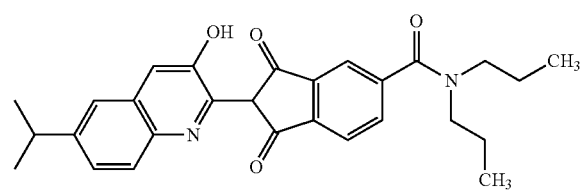

Compound (6-4)

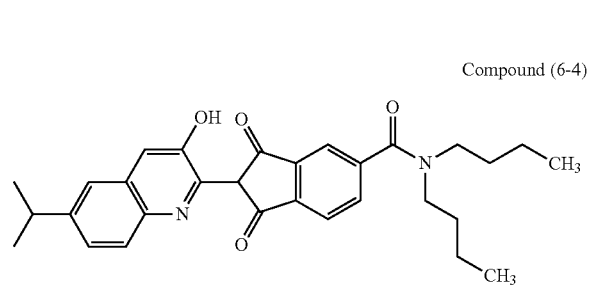

Compound (6-5)

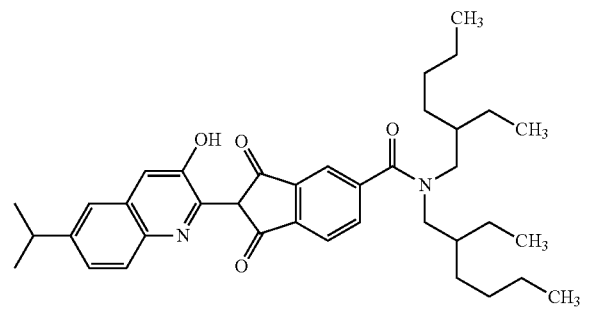

-continued

Compound (6-6)

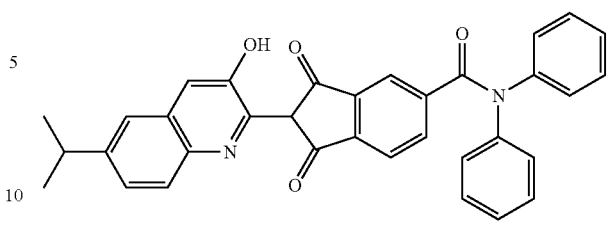

The compound represented by the general formula (6) can be at least one of the compounds (6-3) to (6-5). The use of the compound (6-4) as the compound represented by the general formula (6) can produce an image with high density, good imbalance, and high long-term storage stability under low-energy conditions.

(ii-4) Compound Represented by General Formula (7)

The compound represented by the general formula (7) (yellow dye) is described below.

formula (7)

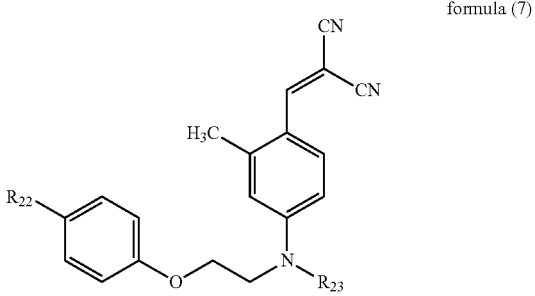

In the general formula (7), $R_{22}$ and $R_{23}$ independently denote an alkyl group or an aryl group.

In the general formula (7), the alkyl group in $R_{22}$ and $R_{23}$ may be a linear, branched, or cyclic, primary, secondary, or tertiary alkyl group having 1 to 20 carbon atoms. More specifically, the alkyl group may be a methyl group, an ethyl group, a n-propyl group, an iso-propyl group, a n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, or a 2-ethylhexyl group. Among these alkyl groups, $R_{22}$ can be a linear, branched, or cyclic alkyl group having 1 to 6 carbon atoms (for example, a methyl group, a butyl group, or a cyclohexyl group) or can be a cyclohexyl group. $R_{23}$ can be a linear alkyl group having 1 to 8 carbon atoms (for example, a methyl group, an ethyl group, or an octyl group) or an ethyl group among these alkyl groups, in order to produce an image with high density, good imbalance, and high long-term storage stability under low-energy conditions.

In the general formula (7), the aryl group in $R_{22}$ and $R_{23}$ may be a phenyl group or a naphthyl group. Among these aryl groups, a phenyl group can result in an image with high density, good imbalance, and high long-term storage stability under low-energy conditions.

Specific examples of the compound represented by the general formula (7) include, but are not limited to, the following compounds (7-1) to (7-5).

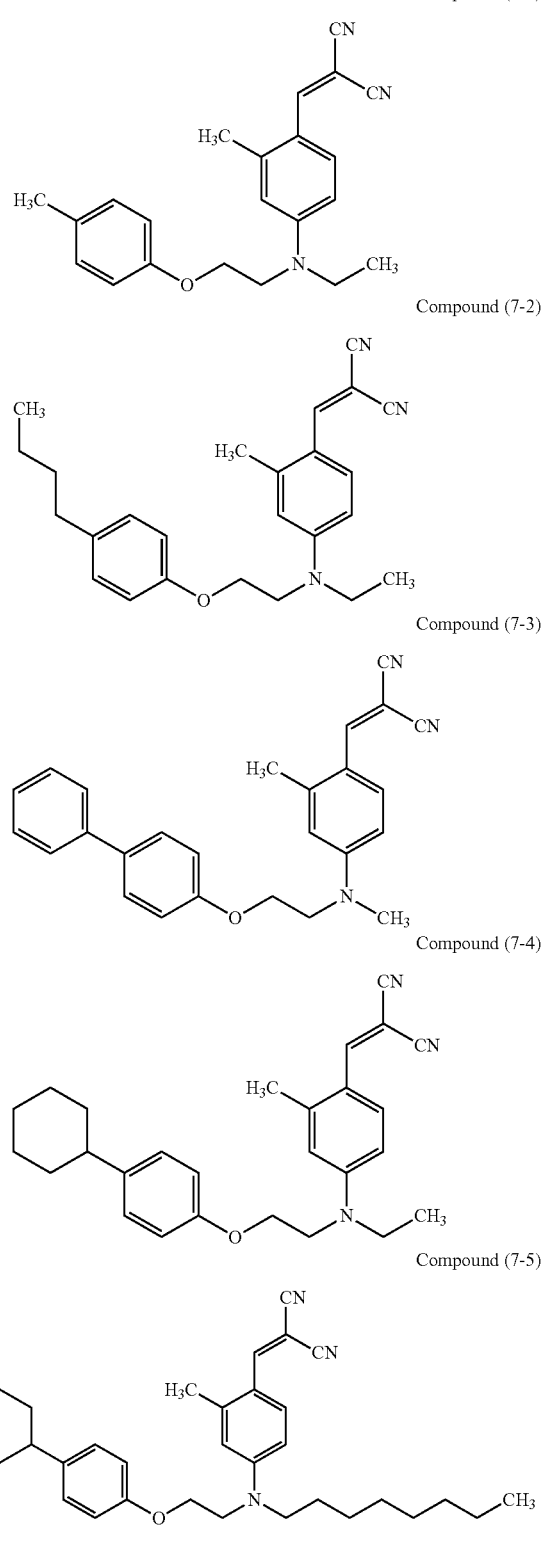

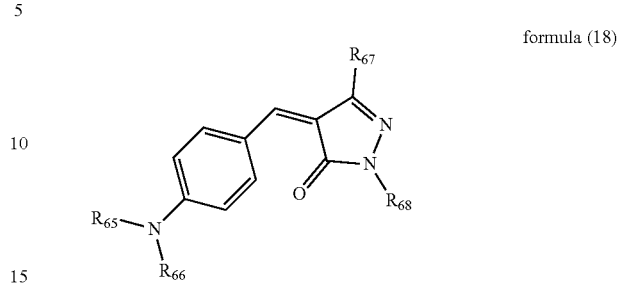

(ii-5) Compound Represented by General Formula (18)

The compound represented by the general formula (18) (cyan dye) is described below.

formula (18)

In the general formula (18), $R_{65}$ and $R_{66}$ independently denote an alkyl group, $R_{67}$ denotes an alkyl group or an alkoxy group, and $R_{68}$ denotes an alkyl group or an aryl group.

In the general formula (18), the alkyl group in $R_{65}$ to $R_{67}$ may be a methyl group, an ethyl group, a n-propyl group, an iso-propyl group, a n-butyl group, a sec-butyl group, or a tert-butyl group.

In the general formula (18), the alkoxy group in $R_{67}$ may be a methoxy group or an ethoxy group.

In the general formula (18), the alkyl group in $R_{68}$ may be a methyl group, an ethyl group, a n-propyl group, an iso-propyl group, a n-butyl group, a sec-butyl group, a tert-butyl group, or a cyclohexyl group.

In the general formula (18), the aryl group in $R_{68}$ may be a phenyl group or a naphthyl group.

Specific examples of the compound represented by the general formula (18) include, but are not limited to, the following compounds (18-1) and (18-2).

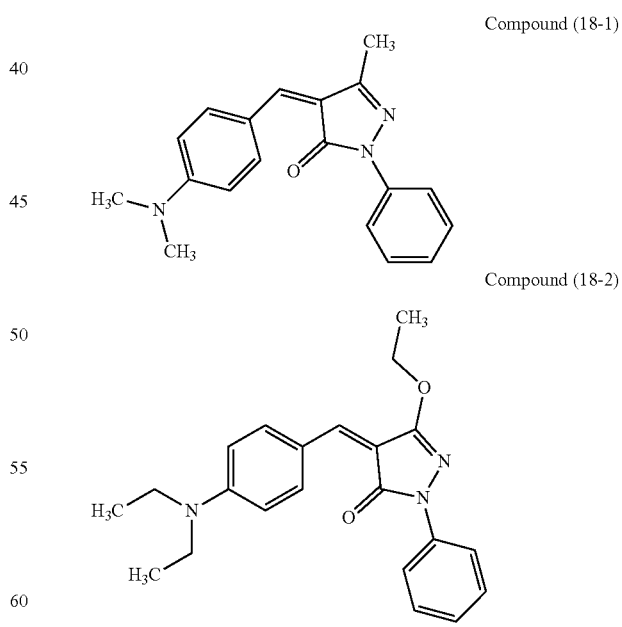

The compound represented by the general formula (7) can be one or both of the compounds (7-4) and (7-5). The use of the compound (7-4) as the compound represented by the general formula (7) can produce an image with high density, good imbalance, and high long-term storage stability under low-energy conditions.

(iii) Cyan Dye (Compound Represented by One of General Formulae (8) to (11))

The cyan coloring material layer contains as a cyan coloring material (cyan dye) at least one selected from the following compound group represented by the general formulae (8) to (11). The cyan coloring material may be composed of one or two or more of these compounds.

(iii-1) Compound Represented by General Formula (8)

The compound represented by the general formula (8) (cyan dye) is described below.

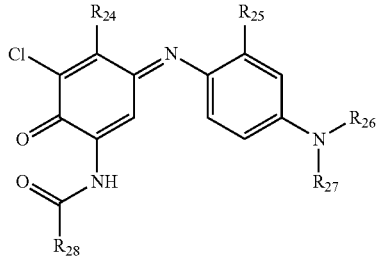

formula (8)

In the general formula (8), $R_{24}$ to $R_{28}$ independently denote an alkyl group or an aryl group.

In the general formula (8), the alkyl group and the aryl group in $R_{24}$ to $R_{28}$ may be the same as in $R_{22}$ and $R_{23}$ in the general formula (7). Among these alkyl groups, a linear or branched alkyl group having 1 to 4 carbon atoms (for example, a methyl group, an ethyl group, a n-butyl group, or a t-butyl group) can result in an image with high density, good imbalance, and high long-term storage stability under low-energy conditions. Among these alkyl groups, an alkyl group having 1 or 2 carbon atoms (a methyl group or an ethyl group) can result in an image with high density, good imbalance, and high long-term storage stability under low-energy conditions. Among the aryl groups, a phenyl group can result in an image with high density, good imbalance, and high long-term storage stability under low-energy conditions.

Specific examples of the compound represented by the general formula (8) include, but are not limited to, the following compounds (8-1) to (8-7).

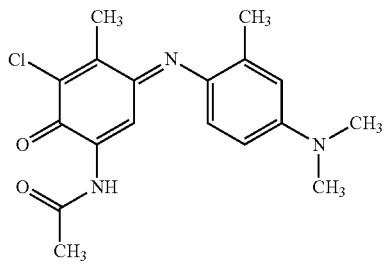

Compound (8-1)

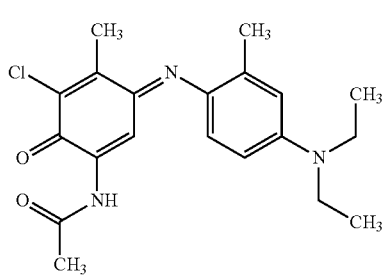

Compound (8-2)

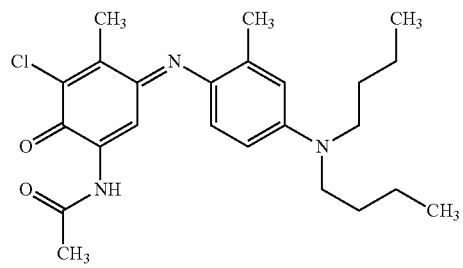

Compound (8-3)

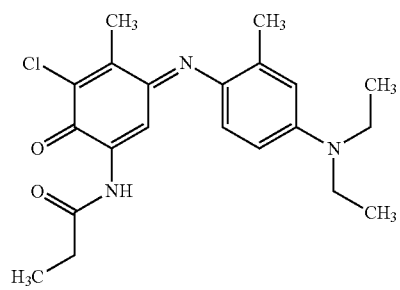

Compound (8-4)

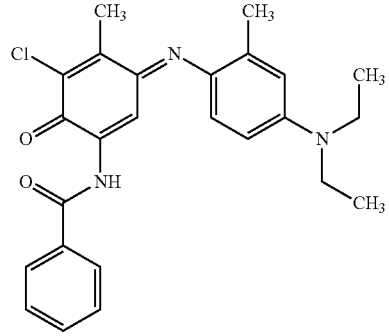

Compound (8-5)

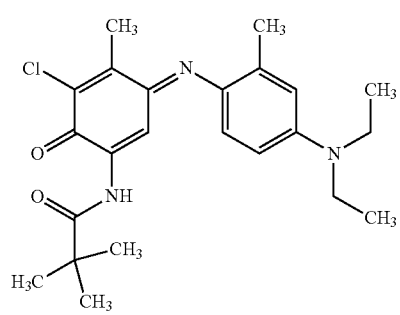

Compound (8-6)

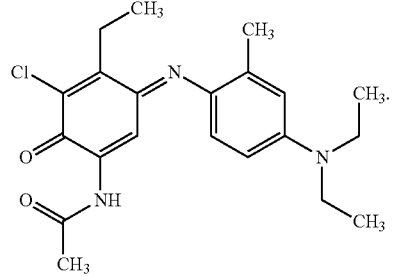

Compound (8-7)

The compound represented by the general formula (8) can be at least one of the compounds (8-1) to (8-3). The use of the compound (8-2) as the compound represented by the general formula (8) can produce an image with high density, good imbalance, and high long-term storage stability under low-energy conditions.

(iii-2) Compound Represented by General Formula (9)

The compound represented by the general formula (9) (cyan dye) is described below.

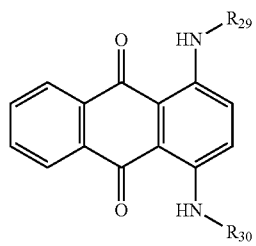

formula (9)

In the general formula (9), $R_{29}$ and $R_{30}$ independently denote an alkyl group, an unsubstituted aryl group, or an aryl group with a substituent.

In the general formula (9), the alkyl group in $R_{29}$ and $R_{30}$ may be the same as in $R_{22}$ and $R_{23}$ in the general formula (7). Among these alkyl groups, a linear alkyl group having 1 to 4 carbon atoms (for example, a methyl group or a butyl group) can result in an image with high density, good imbalance, and high long-term storage stability under low-energy conditions.

In the general formula (9), the aryl group in $R_{29}$ and $R_{30}$ may be a phenyl group or a naphthyl group. The substituent in the aryl group with the substituent may be an alkyl group. The aryl group with the substituent may be a tolyl group (for example, a 3-methylphenyl group) or a p-(n-butyl)phenyl group. Among these aryl groups, a tolyl group (for example, a 3-methylphenyl group) can result in an image with high density, good imbalance, and high long-term storage stability under low-energy conditions. The total number of carbon atoms in the aryl group (including the number of carbon atoms in the substituent) may range from 6 to 10.

Specific examples of the compound represented by the general formula (9) include, but are not limited to, the following compounds (9-1) to (9-6).

Compound (9-1)

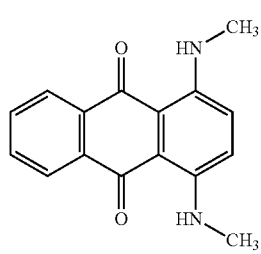

Compound (9-2)

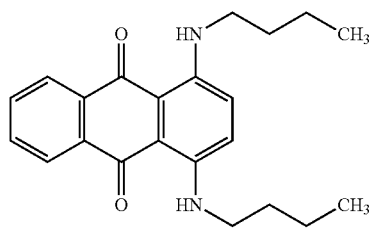

Compound (9-3)

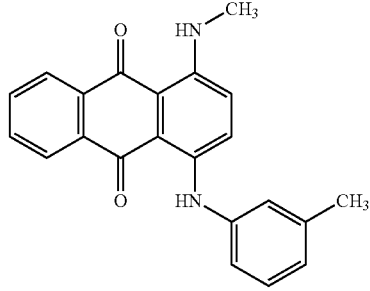

Compound (9-4)

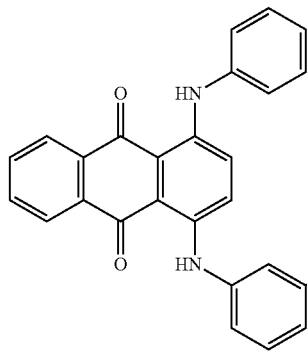

Compound (9-5)

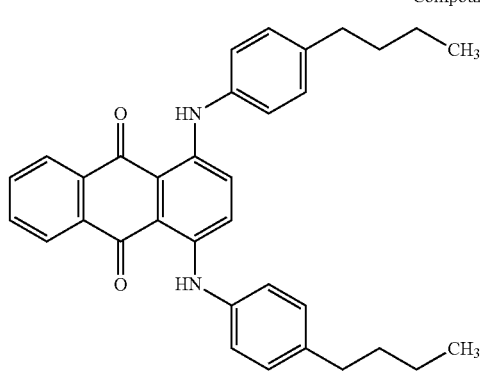

Compound (9-6)

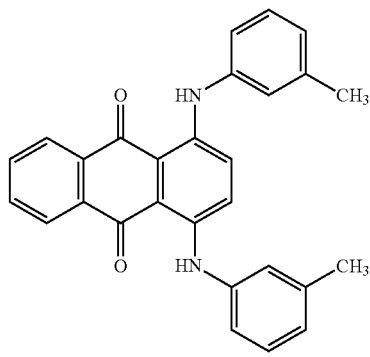

The compound represented by the general formula (9) can be at least one of the compounds (9-2) to (9-6). The use of the compound (9-3) as the compound represented by the general formula (9) can produce an image with high density, good imbalance, and high long-term storage stability under low-energy conditions.

(iii-3) Compound Represented by General Formula (10)

The compound represented by the general formula (10) (cyan dye) is described below.

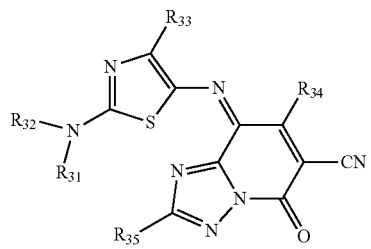

formula (10)

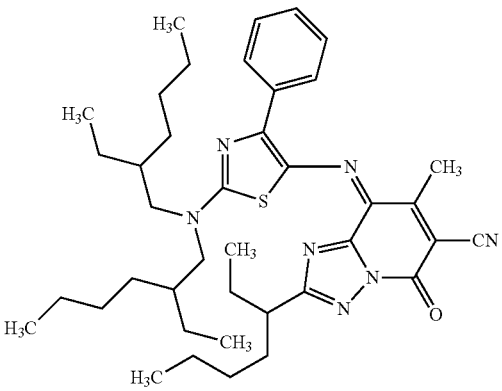

Compound (10-2)

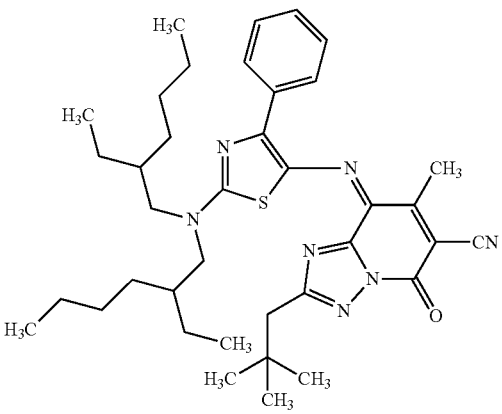

Compound (10-3)

In the general formula (10), $R_{31}$ to $R_{35}$ independently denote an alkyl group, a benzyl group, or an aryl group.

In the general formula (10), the alkyl group in $R_{31}$ to $R_{35}$ may be a linear, branched, or cyclic, primary, secondary, or tertiary alkyl group having 1 to 20 carbon atoms. More specifically, the alkyl group may be a methyl group, an ethyl group, a n-propyl group, an iso-propyl group, a n-butyl group, a sec-butyl group, a tert-butyl group, an iso-pentyl group, an octyl group, a dodecyl group, a nonadecyl group, a cyclobutyl group, a cyclopentyl group, a cyclohexyl group, a methylcyclohexyl group, a 2-ethylpropyl group, a 1-ethylpentyl group, or a 2-ethylhexyl group. Among these alkyl groups, a linear or branched alkyl group having 1 to 8 carbon atoms (for example, a methyl group, a 1-ethylpentyl group, or a 2-ethylhexyl group) can result in an image with high density, good imbalance, and high long-term storage stability under low-energy conditions.

In the general formula (10), the aryl group in $R_{31}$ to $R_{35}$ may be a phenyl group or a naphthyl group. Among these aryl groups, a phenyl group can result in an image with high density, good imbalance, and high long-term storage stability under low-energy conditions.

Specific examples of the compound represented by the general formula (10) include, but are not limited to, the following compounds (10-1) to (10-8).

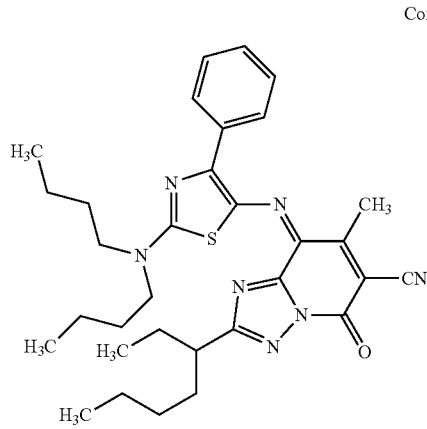

Compound (10-1)

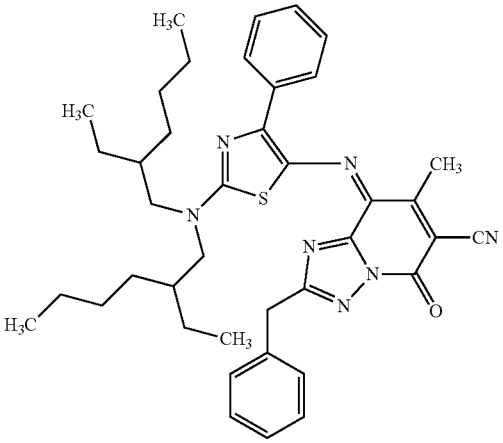

Compound (10-4)

Compound (10-5)

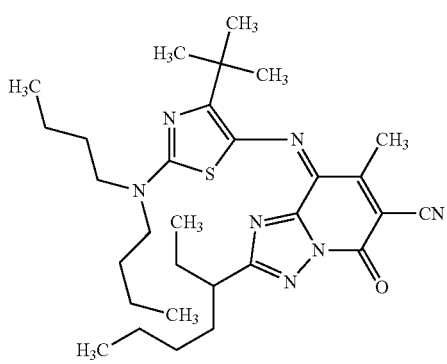

Compound (10-6)

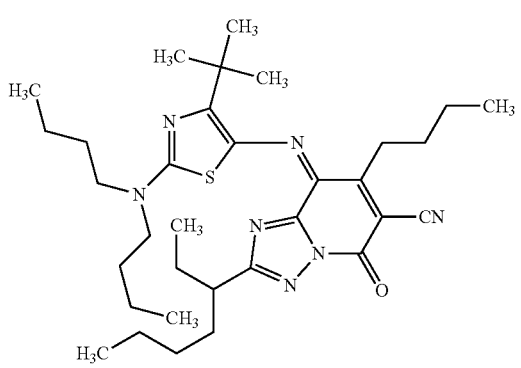

Compound (10-7)

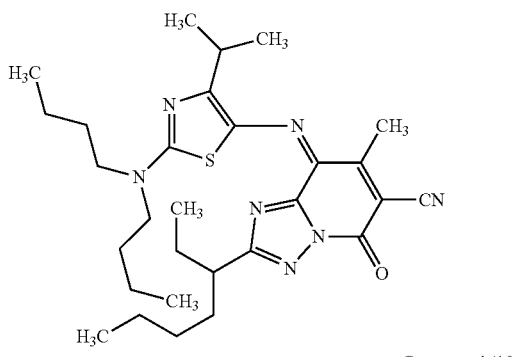

Compound (10-8)

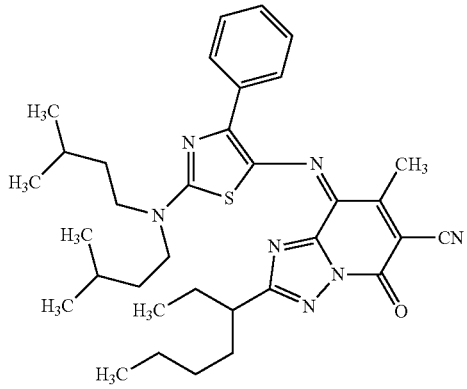

The compound represented by the general formula (10) can be at least one of the compounds (10-1), (10-2), (10-4), and (10-8). The use of the compound (10-1) as the compound represented by the general formula (10) can produce an image with high density, good imbalance, and high long-term storage stability under low-energy conditions.

(iii-4) Compound Represented by General Formula (11)

The compound represented by the general formula (11) (cyan dye) is described below.

formula (11)

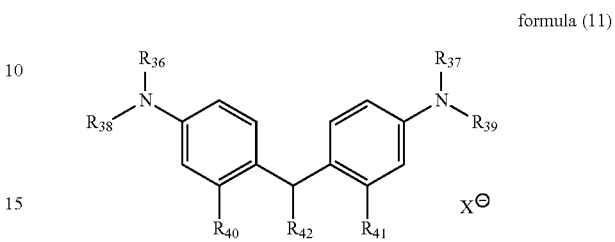

In the general formula (11), $R_{36}$ to $R_{39}$ independently denote a hydrogen atom, an alkyl group, an unsubstituted aryl group, an aryl group with a substituent, or a benzyl group.

In the general formula (11), the alkyl group in $R_{36}$ to $R_{39}$ may be a linear, branched, or cyclic, primary, secondary, or tertiary alkyl group having 1 to 20 carbon atoms. More specifically, the alkyl group may be a methyl group, an ethyl group, a n-propyl group, an iso-propyl group, a n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, or a 2-ethylhexyl group. Among these alkyl groups, a linear or branched alkyl group having 1 to 8 carbon atoms (for example, a methyl group, a 1-ethylpentyl group, or a 2-ethylhexyl group) can result in an image with high density, good imbalance, and high long-term storage stability under low-energy conditions.

In the general formula (11), the aryl group in $R_{36}$ to $R_{39}$ may be a phenyl group or a naphthyl group. The substituent in the aryl group with the substituent may be an alkyl group (for example, an ethyl group), an alkoxy group (for example, a methoxy group), a cyano group, or a sulfone group. Among these aryl groups, a phenyl group can result in an image with high density, good imbalance, and high long-term storage stability under low-energy conditions. The total number of carbon atoms in the aryl group (including the number of carbon atoms in the substituent) may range from 6 to 10.

In the general formula (11), $R_{40}$ and $R_{41}$ independently denote an alkyl group. The alkyl group may be, but is not limited to, a methyl group, an ethyl group, a n-propyl group, an iso-propyl group, or a n-butyl group.

In particular, $R_{40}$ and $R_{41}$ can independently denote a methyl group or an ethyl group or can independently denote a methyl group, in order to produce an image with high density, good imbalance, and high long-term storage stability under low-energy conditions.

In the general formula (11), $R_{42}$ denotes an unsubstituted aryl group or an aryl group with a substituent. The aryl group in $R_{42}$ may be a phenyl group, a naphthyl group, or an anthranyl group. The aryl group with the substituent may be a tetrahydronaphthyl group.

In the general formula (11), $X^-$ denotes an anion. The anion may be, but is not limited to, a fluoride ion, a chloride ion, a bromine ion, an iodine ion, a cyanide ion, a perchloric acid anion, a trifluoromethanesulfonyl anion, a bis(trifluoromethanesulfonyl)imide anion, a naphthalenesulfonyl ion, a tris(trifluoromethanesulfonyl)methide anion, a tetraarylborate anion, or a sulfuric acid anion.
Specific examples of the compound represented by the general formula (11) include, but are not limited to, the following compounds (11-1) to (11-9).
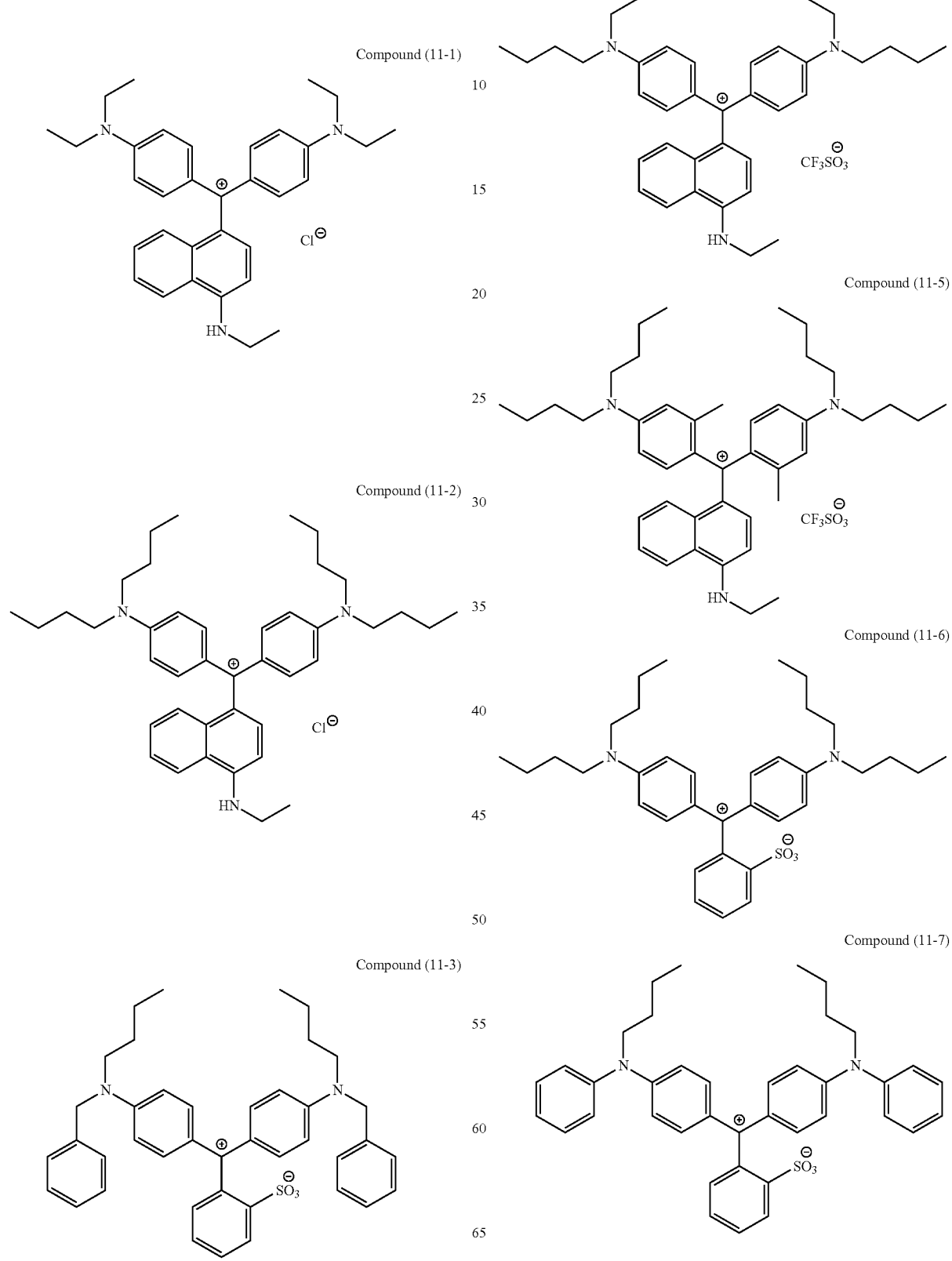

-continued

Compound (11-8)

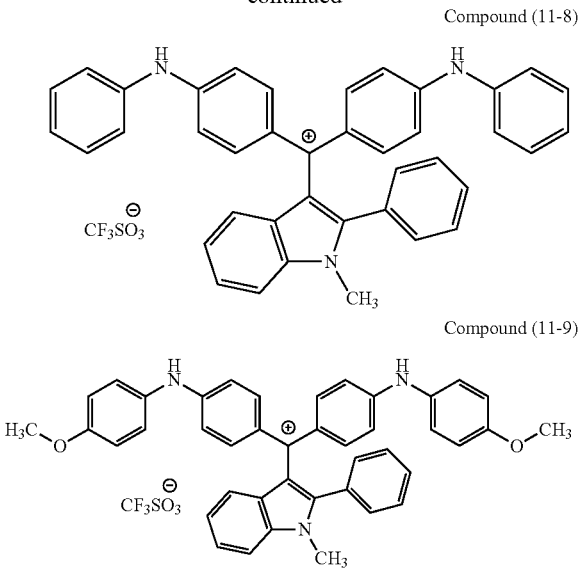

Compound (11-9)

The compound represented by the general formula (11) can be at least one of the compounds (11-1) to (11-7). The use of the compound (11-1), (11-2), (11-4), (11-5), (11-6), or (11-7) as the compound represented by the general formula (11) can produce an image with high density, good imbalance, and high long-term storage stability under low-energy conditions.

In addition to these compounds represented by the general formulae (8) to (11), an existing cyan dye may be used in combination as a cyan dye.

(iv) Magenta Dye (Compound Represented by One of General Formulae (12) to (17))

The magenta coloring material layer can contain as a magenta coloring material (magenta dye) at least one selected from the following compound group represented by the general formulae (12) to (17). The magenta coloring material may be composed of one or two or more of these compounds.

(iv-1) Compound Represented by General Formula (12)

The compound represented by the general formula (12) (magenta dye) is described below.

formula (12)

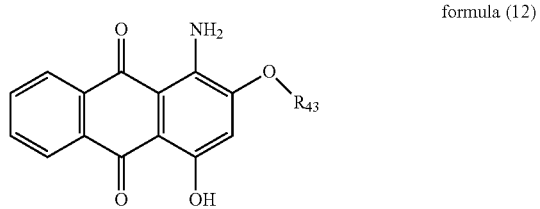

In the general formula (12), $R_{43}$ denotes an unsubstituted alkyl group, an alkyl group in which methylenes are partly substituted with oxygen, an unsubstituted aryl group, or an aryl group with a substituent.

In the general formula (12), the alkyl group in $R_{43}$ may be a linear, branched, or cyclic, primary, secondary, or tertiary alkyl group having 1 or more and 20 or less carbon atoms. Methylenes in these alkyl groups may be partly substituted with oxygen. More specifically, the alkyl group may be a methyl group, an ethyl group, a n-propyl group, an iso-propyl group, a n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, a 2-ethylhexyl group, or an ethoxyethoxyethyl group. Among these, an alkyl group having 1 or more and 8 or less carbon atoms or the alkyl group in which methylenes are partly substituted with oxygen can result in an image with high light fastness and improved imbalance. For example, the alkyl group is a methyl group, a 2-ethylhexyl group, or an ethoxyethoxyethyl group.

In the general formula (12), the aryl group in $R_{43}$ may be a phenyl group or a naphthyl group. The substituent in the aryl group with the substituent may be an alkyl group or an alkoxy group. The aryl group with the substituent may be a tolyl group (for example, a 3-methylphenyl group) or a p-methoxyphenyl group. Among these aryl groups, a phenyl group or a 3-methylphenyl group can result in an image with high density, good imbalance, and high long-term storage stability under low-energy conditions. The total number of carbon atoms in the aryl group may range from 6 to 10.

Specific examples of the compound represented by the general formula (12) include, but are not limited to, the following compounds (12-1) to (12-9).

Compound (12-1)

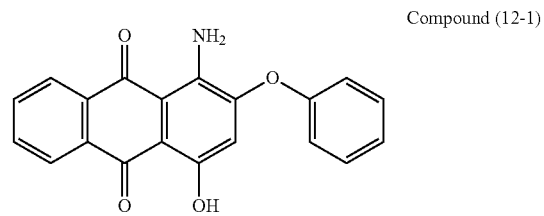

Compound (12-2)

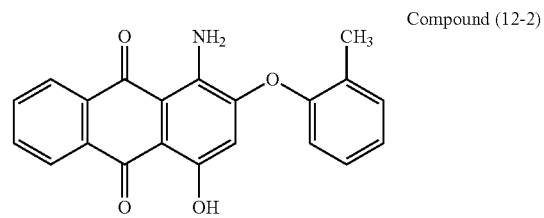

Compound (12-3)

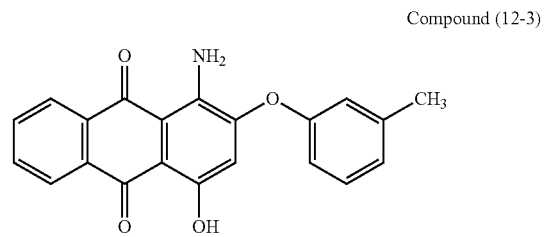

Compound (12-4)

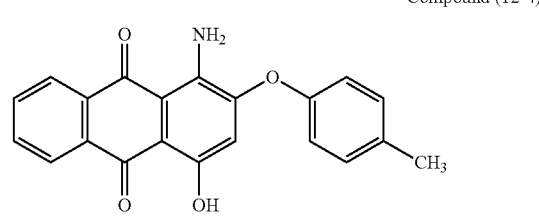

Compound (12-5)
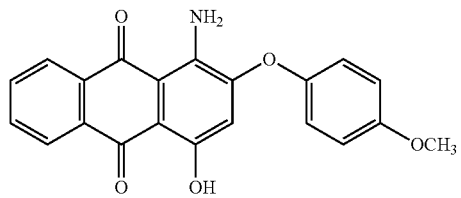

Compound (12-6)
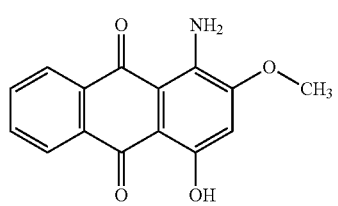

Compound (12-7)
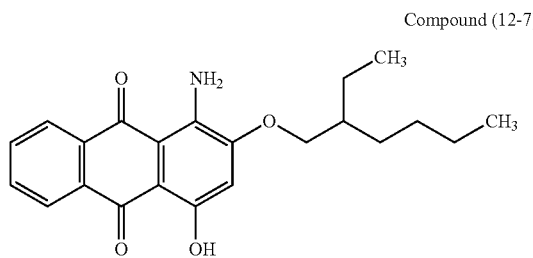

Compound (12-8)
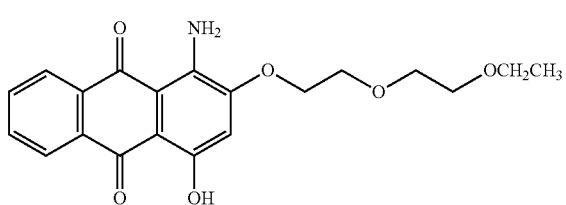

Compound (12-9)
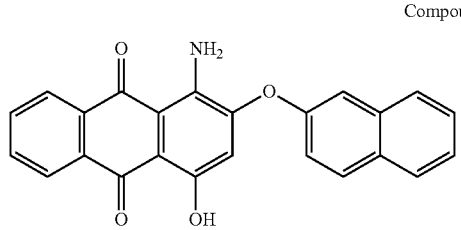

The compound represented by the general formula (12) can be at least one of the compounds (12-1) to (12-5). The use of one or both of the compounds (12-1) and (12-3) as the compound represented by the general formula (12) can produce an image with high density, good imbalance, and high long-term storage stability under low-energy conditions.

(iv-2) Compound Represented by General Formula (13)

The compound represented by the general formula (13) (magenta dye) is described below.

formula (13)
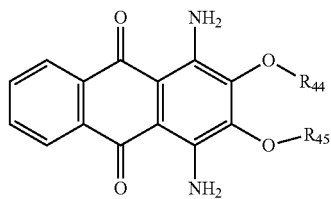

In the general formula (13), $R_{44}$ and $R_{45}$ independently denote an alkyl group, an unsubstituted aryl group, or an aryl group with a substituent.

In the general formula (13), the alkyl group in $R_{44}$ and $R_{45}$ may be the same as in $R_{22}$ and $R_{23}$ in the general formula (7). Among these alkyl groups, a linear alkyl group having 1 to 4 carbon atoms (for example, a methyl group or a butyl group) can result in an image with high density, good imbalance, and high long-term storage stability under low-energy conditions.

In the general formula (13), the aryl group in $R_{44}$ and $R_{45}$ may be a phenyl group or a naphthyl group. The substituent in the aryl group with the substituent may be an alkyl group. The aryl group with the substituent may be a tolyl group (a 2-methylphenyl group, a 3-methylphenyl group, or a 4-methylphenyl group), a xylyl group (for example, a 3,5-dimethylphenyl group), or a p-(n-butyl)phenyl group. Among these aryl groups, a phenyl group, a tolyl group (for example, a 4-methylphenyl group), or a xylyl group (for example, a 3,5-dimethylphenyl group) can result in an image with high density, good imbalance, and high long-term storage stability under low-energy conditions. The total number of carbon atoms in the aryl group may range from 6 to 10.

Specific examples of the compound represented by the general formula (13) include, but are not limited to, the following compounds (13-1) to (13-9).

Compound (13-1)
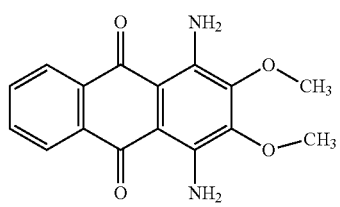

Compound (13-2)
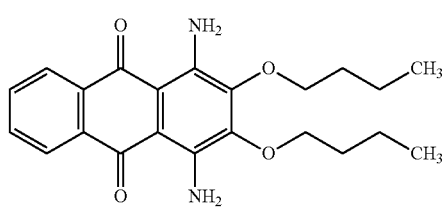

Compound (13-3)
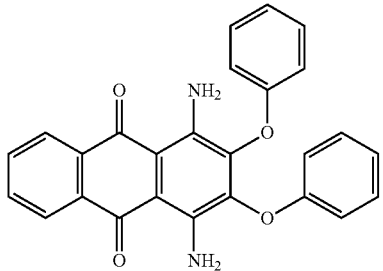

Compound (13-4)
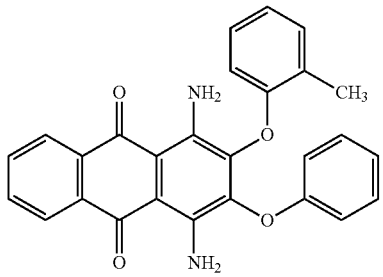

Compound (13-5)
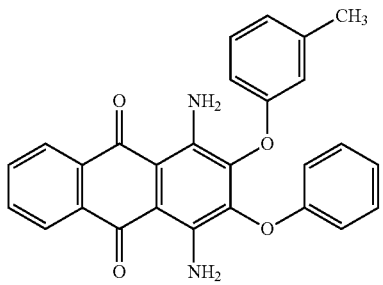

Compound (13-6)
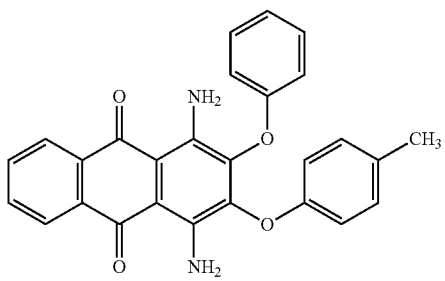

Compound (13-7)
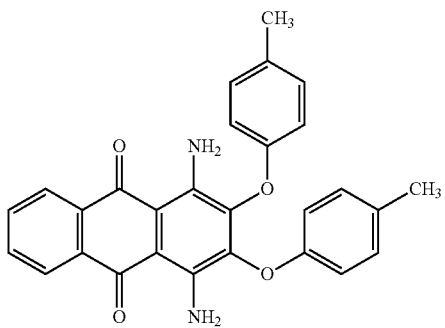

Compound (13-8)
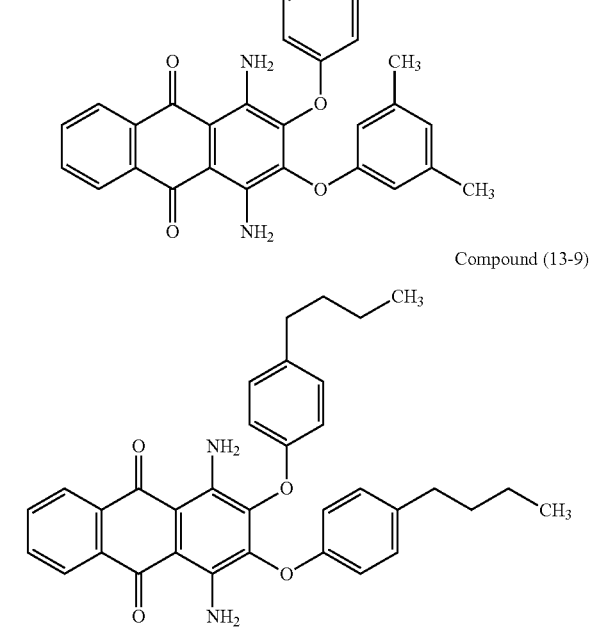

Compound (13-9)

The compound represented by the general formula (13) can be at least one of the compounds (13-3) to (13-8). The use of at least one of the compounds (13-3), (13-7), and (13-8) as the compound represented by the general formula (13) can produce an image with high density, good imbalance, and high long-term storage stability under low-energy conditions.

(iv-3) Compound Represented by General Formula (14)

The compound represented by the general formula (14) (magenta dye) is described below.

formula (14)

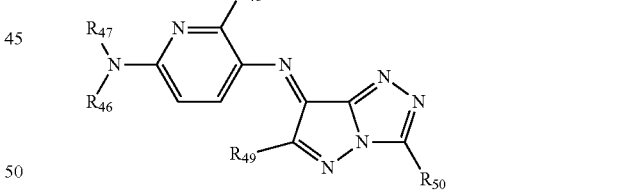

In the general formula (14), $R_{46}$ to $R_{50}$ independently denote an alkyl group, an unsubstituted aryl group, or an aryl group with a substituent.

In the general formula (14), the alkyl group in $R_{46}$ to $R_{50}$ may be the same as in $R_{22}$ and $R_{23}$ in the general formula (7). Among these alkyl groups, a linear or branched alkyl group having 1 to 4 carbon atoms (for example, a methyl group, an ethyl group, a n-butyl group, or a t-butyl group) can result in an image with high density, good imbalance, and high long-term storage stability under low-energy conditions.

In the general formula (14), the aryl group in $R_{46}$ to $R_{50}$ may be a phenyl group or a naphthyl group. The substituent in the aryl group with the substituent may be an alkyl group or an alkoxy group. The aryl group with the substituent may be a tolyl group (a 2-methylphenyl group, a 3-methylphenyl group, or a 4-methylphenyl group) or a p-methoxyphenyl group. Among these aryl groups, a phenyl group, a tolyl group, or a p-methoxyphenyl group, particularly a tolyl group, can result in an image with high density, good imbalance, and high long-term storage stability under low-energy conditions. The total number of carbon atoms in the aryl group (including the number of carbon atoms in the substituent) may range from 6 to 10.

Specific examples of the compound represented by the general formula (14) include, but are not limited to, the following compounds (14-1) to (14-9).

Compound (14-1)

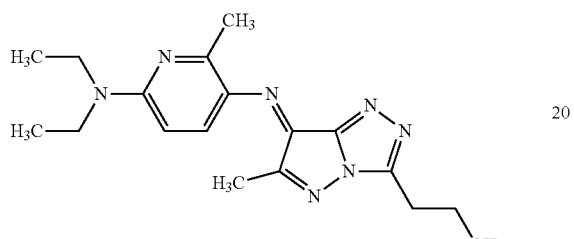

Compound (14-2)

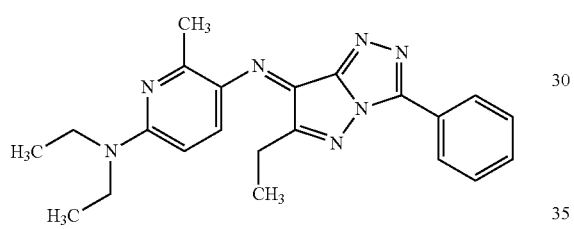

Compound (14-3)

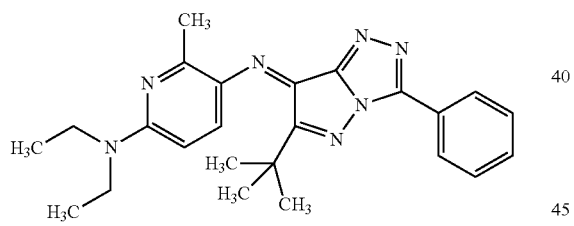

Compound (14-4)

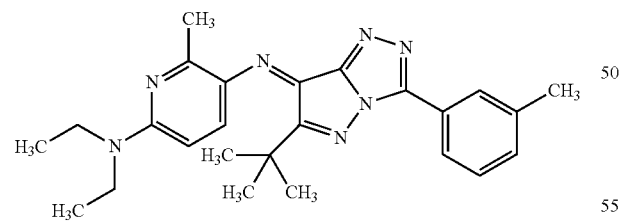

Compound (14-5)

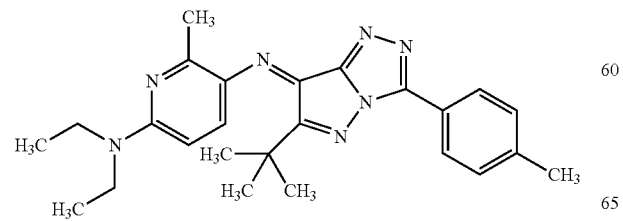

Compound (14-6)

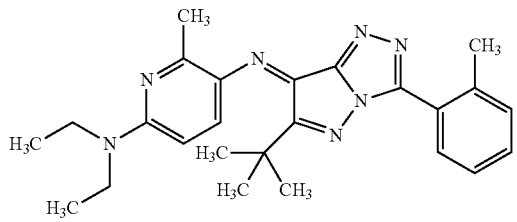

Compound (14-7)

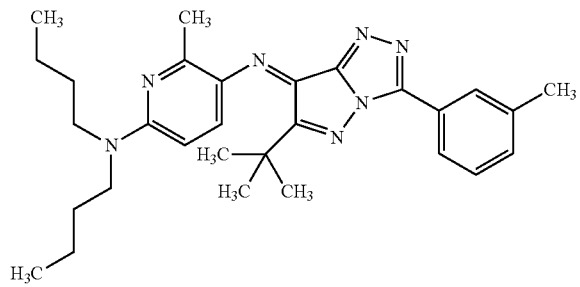

Compound (14-8)

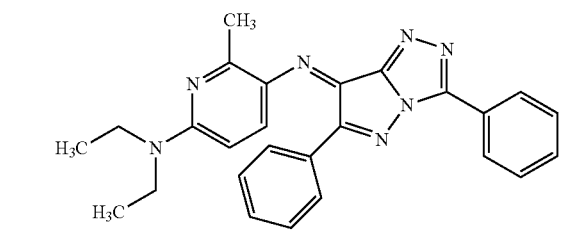

Compound (14-9)

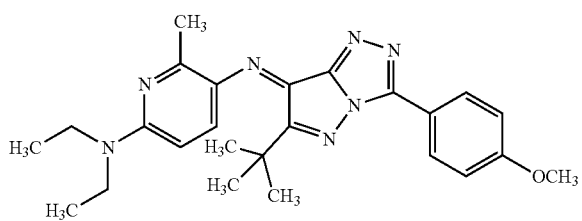

The compound represented by the general formula (14) can be at least one of the compounds (14-3) to (14-7). The use of at least one of the compounds (14-4) to (14-6) as the compound represented by the general formula (14) can produce an image with high density, good imbalance, and high long-term storage stability under low-energy conditions.

(iv-4) Compound Represented by General Formula (15)

The compound represented by the general formula (15) (magenta dye) is described below.

formula (15)

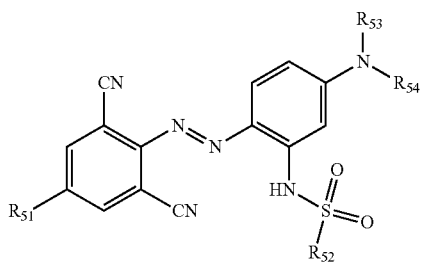

In the general formula (15), $R_{51}$ to $R_{54}$ independently denote an alkyl group, an unsubstituted aryl group, or an aryl group with a substituent.

In the general formula (15), the alkyl group in $R_{51}$ to $R_{54}$ may be the same as in $R_{22}$ and $R_{23}$ in the general formula (7). Among these alkyl groups, a linear or branched alkyl group having 1 to 4 carbon atoms (for example, a methyl group, an ethyl group, a n-propyl group, or a t-butyl group) can result in an image with high density, good imbalance, and high long-term storage stability under low-energy conditions.

In the general formula (15), the aryl group in $R_{51}$ to $R_{54}$ may be a phenyl group or a naphthyl group. The substituent in the aryl group with the substituent may be an alkyl group or an alkoxy group. The aryl group with the substituent may be a tolyl group (for example, a 4-methylphenyl group). Among these aryl groups, a phenyl group or a tolyl group, particularly a tolyl group, can result in an image with high density, good imbalance, and high long-term storage stability under low-energy conditions. The total number of carbon atoms in the aryl group (including the number of carbon atoms in the substituent) may range from 6 to 10.

Specific examples of the compound represented by the general formula (15) include, but are not limited to, the following compounds (15-1) to (15-9).

Compound (15-1)

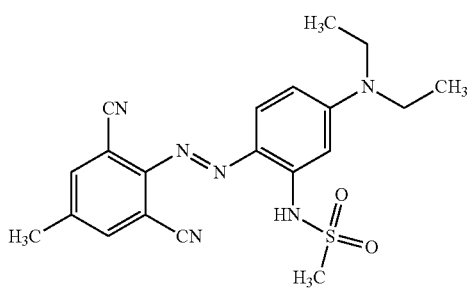

Compound (15-2)

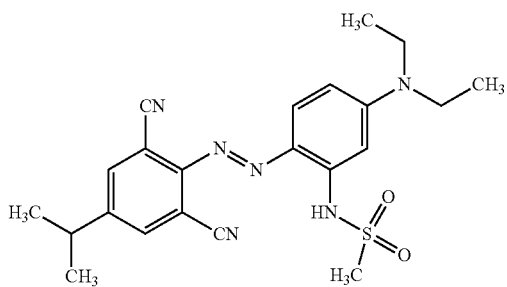

Compound (15-3)

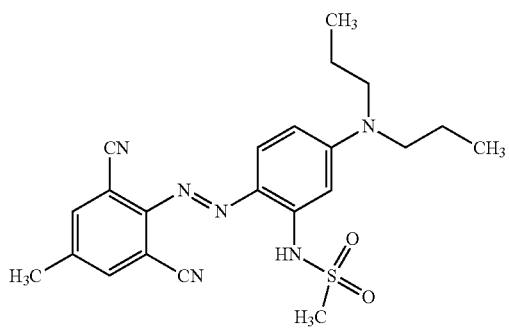

Compound (15-4)

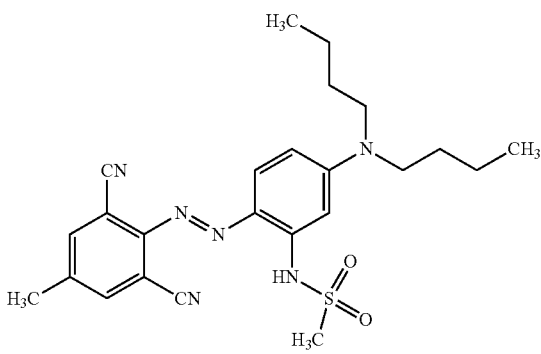

Compound (15-5)

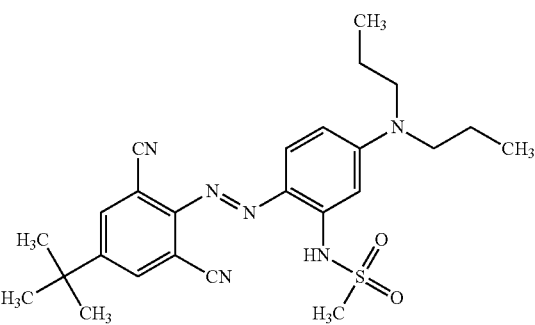

Compound (15-6)

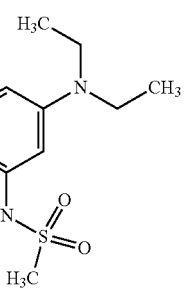

Compound (15-7)

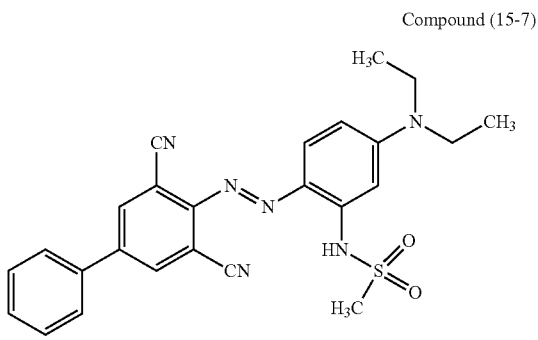

Compound (15-8)

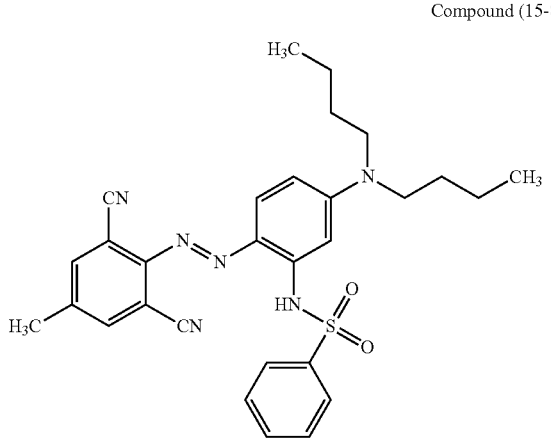

Compound (15-9)

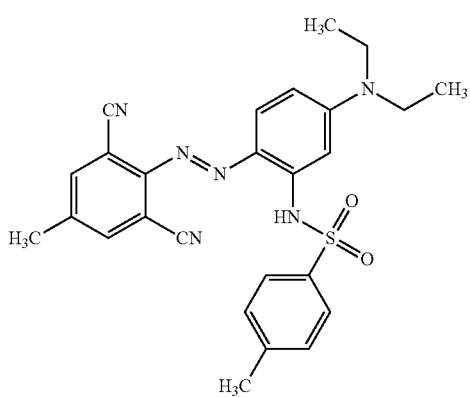

The compound represented by the general formula (15) can be at least one of the compounds (15-1) and (15-3) to (15-5). The use of the compound (15-3) as the compound represented by the general formula (15) can produce an image with high density, good imbalance, and high long-term storage stability under low-energy conditions.

(iv-5) Compound Represented by General Formula (16)

The compound represented by the general formula (16) (magenta dye) is described below.

formula (16)

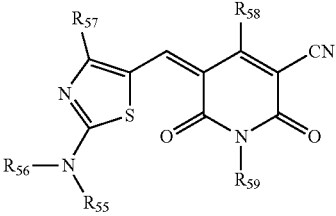

In the general formula (16), $R_{55}$ and $R_{56}$ independently denote an alkyl group.

$R_{57}$ denotes a hydrogen atom, an alkyl group, an unsubstituted aryl group, or an aryl group with a substituent.

$R_{58}$ denotes an alkyl group, an unsubstituted aryl group, or an aryl group with a substituent.

$R_{59}$ denotes a hydrogen atom, an alkyl group, an unsubstituted aryl group, an aryl group with a substituent, or $-N(-R_{60})R_{61}$.

$R_{60}$ and $R_{61}$ satisfy the following (i) or (ii).

(i) $R_{60}$ and $R_{61}$ independently denote a hydrogen atom, an alkyl group, an aryl group, or an acyl group.

(ii) $R_{60}$ and $R_{61}$ are bonded together and form a ring, and $R_{60}$ and $R_{61}$ denote an atomic group required to form the ring.

In the general formula (16), the alkyl group in $R_{55}$ and $R_{56}$ may be a linear, branched, or cyclic, primary, secondary, or tertiary alkyl group having 1 to 20 carbon atoms. More specifically, the alkyl group may be a methyl group, an ethyl group, a n-propyl group, an iso-propyl group, a n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-butylbutyl group, a 2-ethylpropyl group, or a 2-ethylhexyl group. Among these alkyl groups, a branched alkyl group, such as a 2-butylbutyl group or a 2-ethylhexyl group, can result in an image with high density, good imbalance, and high long-term storage stability under low-energy conditions.

In the general formula (16), the alkyl group in $R_{57}$ may be the same as in $R_{22}$ and $R_{23}$ in the general formula (7). Among these alkyl groups, a tert-butyl group can result in an image with high density, good imbalance, and high long-term storage stability under low-energy conditions.

In the general formula (16), the aryl group in $R_{57}$ may be a phenyl group or a naphthyl group. The substituent in the aryl group with the substituent may be an alkyl group, such as a methyl group or an ethyl group, or an alkoxy group, such as a methoxy group. The aryl group with the substituent may be a tolyl group (a 2-methylphenyl group, a 3-methylphenyl group, or a 4-methylphenyl group), a xylyl group (for example, a 2,6-dimethylphenyl group), a 2,6-diethylphenyl group, a 3-methoxyphenyl group, a 2,6-dimethoxyphenyl group, a 2,4,6-trimethylphenyl group, or a 2,4,6-triethylphenyl group. Among these aryl groups, a phenyl group or a 3-methylphenyl group can result in an image with high density, good imbalance, and high long-term storage stability under low-energy conditions. The total number of carbon atoms in the aryl group (including the number of carbon atoms in the substituent) may range from 6 to 12.

As described above, $R_{57}$ can be a phenyl group or a tert-butyl group. In particular, from the perspective of light fastness and imbalance, $R_{57}$ can be a tert-butyl group.

In the general formula (16), the alkyl group in $R_{58}$ may be a linear or branched primary, secondary, or tertiary alkyl group having 1 to 8 carbon atoms (for example, the number of carbon atoms in the main chain ranges from 1 to 4). More specifically, the alkyl group may be a methyl group, an ethyl group, a n-propyl group, an iso-propyl group, a n-butyl group, an iso-butyl group, a 2-methylbutyl group, or a 2,3,3-trimethylbutyl group. Among these alkyl groups, a methyl group can result in an image with high density, good imbalance, and high long-term storage stability under low-energy conditions.

In the general formula (16), the aryl group in $R_{58}$ may be a phenyl group. The substituent in the aryl group with the substituent may be an alkyl group, such as a methyl group, or an alkoxy group, such as a methoxy group. The aryl group with the substituent may be a tolyl group (a 2-methylphenyl group, a 3-methylphenyl group, or a 4-methylphenyl group), a 4-methoxyphenyl group, or a xylyl group (for example, a 3,5-dimethylphenyl group). Among these aryl groups, a phenyl group can result in an image with high density, good imbalance, and high long-term storage stability under low-energy conditions. The total number of carbon atoms in the aryl group (including the number of carbon atoms in the substituent) may range from 6 to 8.

In the general formula (16), the alkyl group in $R_{59}$ may be a linear or branched, primary, secondary, or tertiary alkyl group having 1 to 8 carbon atoms. More specifically, the alkyl group may be a methyl group, an ethyl group, a n-propyl group, an iso-propyl group, a n-butyl group, or an iso-butyl group. Among these alkyl groups, a methyl group can result in an image with high density, good imbalance, and high long-term storage stability under low-energy conditions.

In the general formula (16), the aryl group in $R_{59}$ may be a phenyl group or a naphthyl group. The substituent in the aryl group with the substituent may be an alkyl group, such as a methyl group, or an alkoxy group, such as a methoxy group. Among these aryl groups, a phenyl group can result in an image with high density, good imbalance, and high long-term storage stability under low-energy conditions. The total number of carbon atoms in the aryl group (including the number of carbon atoms in the substituent) may range from 6 to 12.

In the general formula (16), when $R_{59}$ is —N(—$R_{60}$)$R_{61}$, the alkyl group in $R_{60}$ and $R_{61}$ may be the same as in $R_{22}$ and $R_{23}$ in the general formula (7). Among these alkyl groups, a methyl group can result in an image with high density, good imbalance, and high long-term storage stability under low-energy conditions.

In the general formula (16), when $R_{59}$ is —N(—$R_{60}$)$R_{61}$, the aryl group in $R_{60}$ and $R_{61}$ may be a phenyl group or a naphthyl group. Among these aryl groups, a phenyl group can result in an image with high density, good imbalance, and high long-term storage stability under low-energy conditions.

In the general formula (16), when $R_{58}$ is —N(—$R_{60}$)$R_{61}$, the acyl group in $R_{60}$ and $R_{61}$ may be an unsubstituted alkyl carbonyl group having 2 to 30 carbon atoms, a substituted or unsubstituted aryl carbonyl group having 7 to 30 carbon atoms, or —C(=O)-A (A denotes a heterocycle). More specifically, the acyl group may be an acetyl group, a propionyl group, a pivaloyl group, a benzoyl group, or a naphthoyl group. The —C(=O)-A may be a 2-pyridylcarbonyl group or a 2-furylcarbonyl group. The substituent of the aryl carbonyl group may be an alkyl group having 1 to 4 carbon atoms or an alkoxy group having 1 to 4 carbon atoms.

In the general formula (16), when $R_{59}$ is —N(—$R_{60}$)$R_{61}$, and $R_{60}$ and $R_{61}$ are bonded together and form a ring, the ring may be a piperidine ring, a piperazine ring, or a morpholine ring.

In particular, at least one of $R_{60}$ and $R_{61}$ can be an alkyl group in terms of high light fastness. When at least one of $R_{60}$ and $R_{61}$ is a methyl group, an image with high density, good imbalance, and high long-term storage stability under low-energy conditions can be produced.

Specific examples of the compound represented by the general formula (16) include, but are not limited to, the following compounds (16-1) to (16-11).

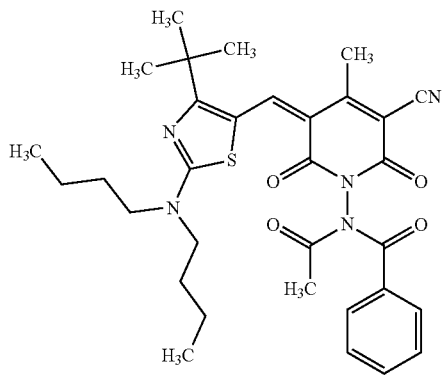

Compound (16-1)

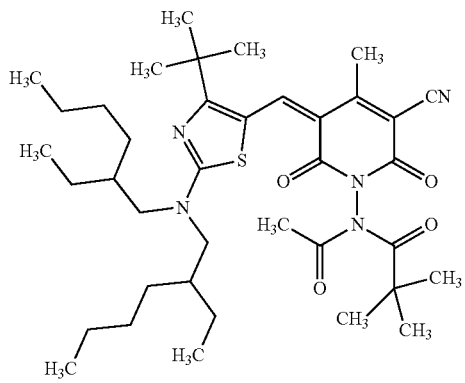

Compound (16-2)

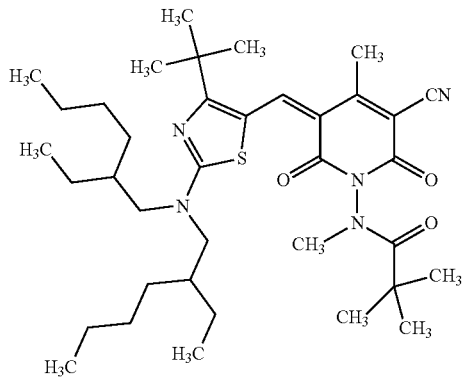

Compound (16-3)

Compound (16-4)
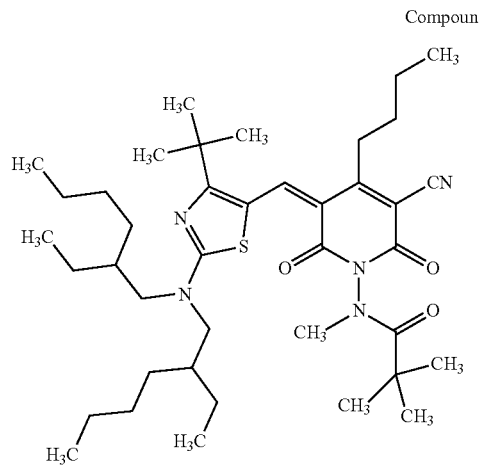
Compound (16-5)
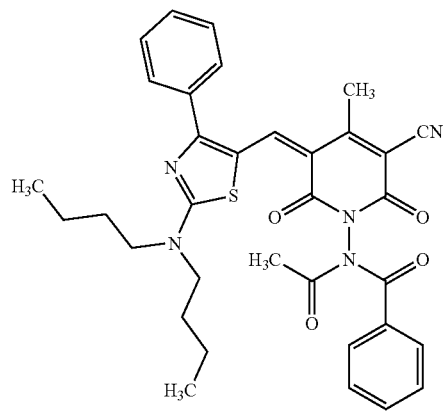
Compound (16-6)
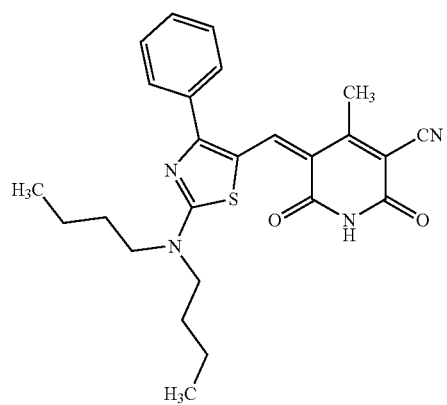
Compound (16-7)
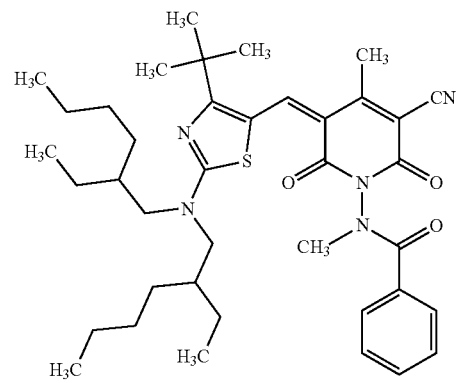
Compound (16-8)
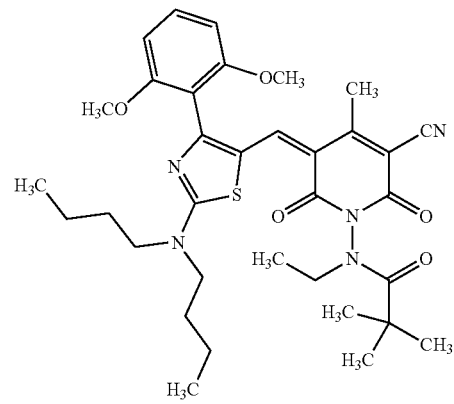
Compound (16-9)
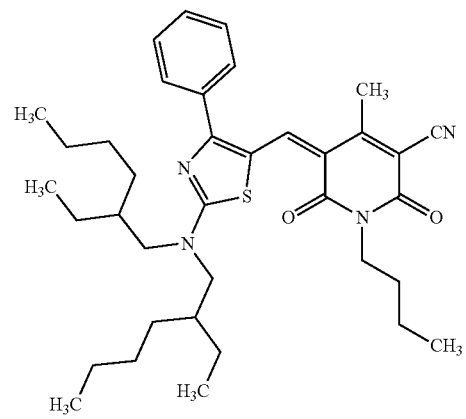

-continued

Compound (16-10)

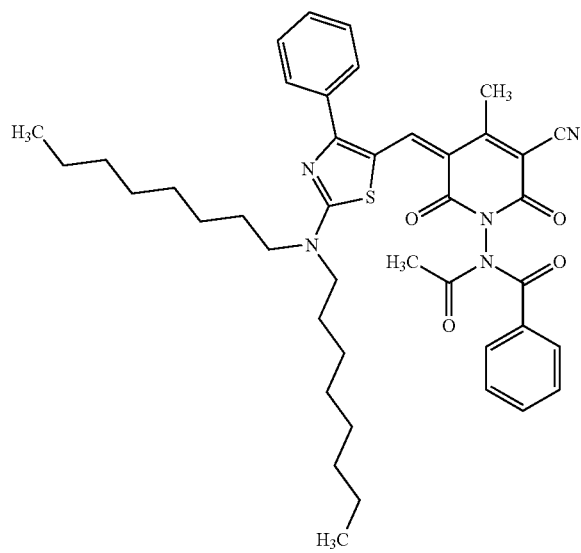

Compound (16-11)

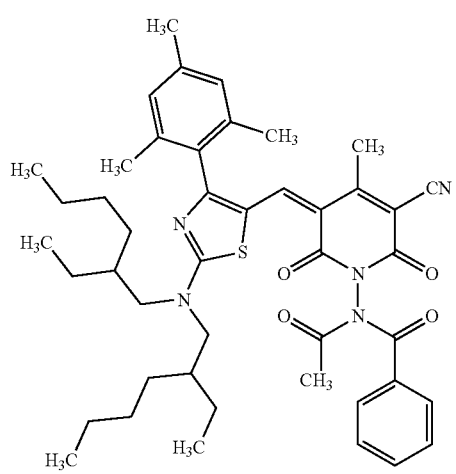

The use of at least one of the compounds (16-1) to (16-3) and (16-7) as the compound represented by the general formula (16) can produce an image with high density, good imbalance, and high long-term storage stability under low-energy conditions.

(iv-6) Compound Represented by General Formula (17)

The compound represented by the general formula (17) (magenta dye) is described below.

formula (17)

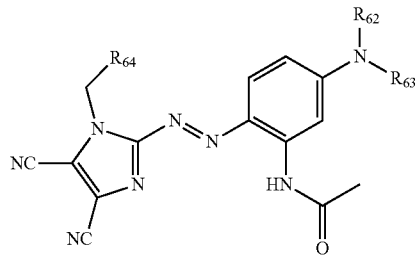

In the general formula (17), $R_{62}$ and $R_{63}$ independently denote an alkyl group. $R_{64}$ denotes an alkenyl group or a phenyl group.

In the general formula (17), the alkyl group in $R_{62}$ and $R_{63}$ may be the same as in $R_{22}$ and $R_{23}$ in the general formula (7). Among these alkyl groups, a linear or branched alkyl group having 1 to 4 carbon atoms (for example, a methyl group, an ethyl group, a n-propyl group, or a t-butyl group) can result in an image with high density, good imbalance, and high long-term storage stability under low-energy conditions.

In the general formula (17), the alkenyl group in $R_{64}$ may be a 2-propenyl group.

Specific examples of the compound represented by the general formula (17) include, but are not limited to, the following compounds (17-1) to (17-6).

Compound (17-1)

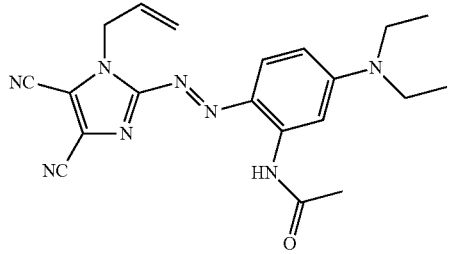

Compound (17-2)

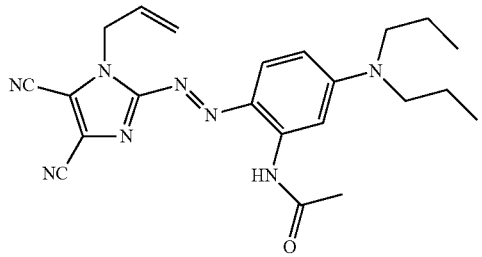

Compound (17-3)

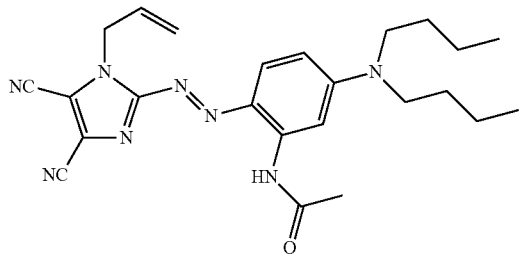

Compound (17-4)

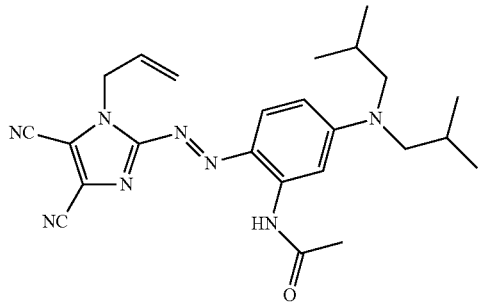

Compound (17-5)

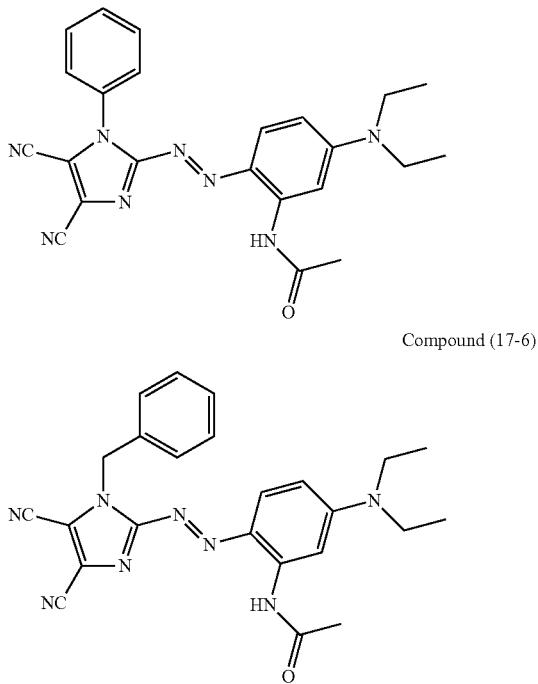

Compound (17-6)

The use of at least one of the compounds (17-1) to (17-4) as the compound represented by the general formula (17) can produce an image with high density, good imbalance, and high long-term storage stability under low-energy conditions.

In addition to these compounds represented by the general formulae (12) to (17), an existing magenta dye may be used in combination as a magenta dye.

(v) Binder Resin

Binder resins for use in the coloring material layers of the thermal transfer recording sheet are not particularly limited and may be various resins. In particular, the following water-soluble resins and organic-solvent-soluble resins can be used.

Water-soluble resins: cellulose resins, polyacrylic resins, starch resins, and epoxy resins.

Organic-solvent-soluble resins: polyacrylate resins, polymethacrylate resins, polystyrene resins, polycarbonate resins, polyethersulfone resins, poly(vinyl butyral) resins, ethylcellulose resins, cellulose acetate resins, polyester resins, AS resins, and phenoxy resins.

These binder resins may be used alone or in combination, as required.

(vi) Surfactant

A surfactant may be added to each coloring material layer of the thermal transfer recording sheet to provide sufficient lubricity during thermal head heating (printing). A surfactant to be added to each coloring material layer may be a cationic surfactant, an anionic surfactant, or a nonionic surfactant.

Examples of the cationic surfactant include, but are not limited to, dodecylammonium chloride, dodecylammonium bromide, dodecyltrimethylammonium bromide, dodecylpyridinium chloride, dodecylpyridinium bromide, and hexadecyltrimethylammonium bromide.

Examples of the anionic surfactant include, but are not limited to, fatty acid soaps, such as sodium stearate and sodium dodecanoate, sodium dodecyl sulfate, sodium dodecylbenzene sulfonate, and sodium lauryl sulfate.

Examples of the nonionic surfactant include, but are not limited to, dodecyl polyoxyethylene ether, hexadecyl polyoxyethylene ether, nonylphenyl polyoxyethylene ether, lauryl polyoxyethylene ether, sorbitan monooleate polyoxyethylene ether, and monodecanoyl sucrose.

(vii) Wax

A wax may be added to each coloring material layer of the thermal transfer recording sheet to provide sufficient lubricity while a thermal head is not heated. A wax to be added to each coloring material layer may be, but is not limited to, a polyethylene wax, a paraffin wax, or a fatty acid ester wax.

(viii) Other Additive Agents

In addition to the additives described above, if necessary, an ultraviolet absorber, a preservative, an antioxidant, an antistatic agent, and/or a viscosity modifier may be added to each coloring material layer of the thermal transfer recording sheet.

(ix) Medium

A medium for use in the preparation of each dye composition of the thermal transfer recording sheet may be, but is not limited to, water or an organic solvent. The organic solvent may be as follows: an alcohol, such as methanol, ethanol, isopropanol, or isobutanol; a cellosolve, such as methyl cellosolve or ethyl cellosolve; an aromatic hydrocarbon, such as toluene, xylene or chlorobenzene; an ester, such as ethyl acetate or butyl acetate; a ketone, such as acetone, methyl ethyl ketone, methyl isobutyl ketone, or cyclohexanone; a halogenated hydrocarbon, such as methylene chloride, chloroform, or trichloroethylene; an ether, such as tetrahydrofuran or dioxane; N,N-dimethylformamide, or N-methylpyrrolidone. These organic solvents may be used alone or in combination, as required. Water and an organic solvent may be used in combination.

(I-2-3) Composition of Dye Composition for Use in Formation of Coloring Material Layer Dye Content (Used Amount)

The amount of each coloring material (yellow dye, magenta dye, or cyan dye) to be used in each dye composition preferably ranges from 1 to 200 parts by mass in total per 100 parts by mass of a binder resin in terms of the storage stability of the sheet, more preferably 50 to 180 parts by mass per 100 parts by mass of the binder resin in terms of the dispersion of the coloring material. For a mixture of two or more coloring materials, the amount of each coloring material to be used refers to the total parts by mass of the coloring materials. For example, when a compound represented by one of the general formulae (4) to (7) and an existing dye are used in combination as a yellow dye, the amount of dye to be used refers to the total parts by mass of these dyes.

First Compound Content (Used Amount)

The first compound content of a dye composition (for example, a yellow dye composition) can be in the following range to produce an image with high density, good imbalance, and high long-term storage stability under low-energy conditions. The total amount of the first compound represented by one of the general formulae (1) to (3) to be used in a dye composition preferably ranges from 5 to 25 parts by mass, more preferably 8 to 20 parts by mass, still more preferably 8 to 15 parts by mass, per 100 parts by mass of dye (the total parts by mass of dye to be used).

Another Component Content (Used Amount)

The amount of another component (additive agent) to be used can be appropriately determined and is not particularly limited.

(I-3) Another Layer
(i) Black Coloring Material Layer

In addition to the at least three coloring material layers including a yellow coloring material layer, a magenta coloring material layer, and a cyan coloring material layer, the thermal transfer recording sheet may include a known black coloring material layer as a coloring material layer. The black coloring material layer can be formed of a composition containing a black dye or containing an existing yellow dye, an existing magenta dye, and an existing cyan dye and may contain the first compound represented by one of the general formulae (1) to (3).

(ii) Transferable Protective Layer

The thermal transfer recording sheet may include on the substrate a transferable protective layer for protecting the image surface after image formation, frame-sequentially formed on the coloring material layers. The transferable protective layer may be formed on a sheet (substrate) different from the sheet (substrate) on which the coloring material layers are formed. In such a case, a thermal transfer recording sheet according to the present disclosure includes a sheet (coloring material layer sheet) including a substrate and the coloring material layers and a sheet (protective layer sheet) including a substrate and the transferable protective layer.

(I-4) Method for Producing Thermal Transfer Recording Sheet

The thermal transfer recording sheet includes coloring material layers frame-sequentially formed on a substrate. For example, a yellow coloring material layer, a magenta coloring material layer, and a cyan coloring material layer can be repeatedly formed on a substrate (substrate sheet) in the substrate movement direction. In a thermal transfer recording sheet including the coloring material layers in this order, a yellow image is first formed, then a magenta image is formed, and a cyan image is then formed. The successive image formation produces one full-color image. This successive image formation is repeatedly performed. The thermal transfer recording sheet may further include a coloring material layer other than these coloring material layers, for example, a black coloring material layer (a thermofusible black layer), on the substrate.

Each coloring material layer can be formed by applying the corresponding coloring material layer composition (dye composition) to the substrate and drying the composition. Each dye composition may be applied to the substrate by any method, for example, by using a bar coater, a gravure coater, a reverse roll coater, a rod coater, or an air doctor coater. The thickness can be easily adjusted by a coating method using a gravure coater.

The drying conditions after the application of each dye composition may be any conditions under which the dye composition can be thoroughly dried, for example, at a temperature in the range of 50° C. to 120° C. for 1 second to 5 minutes. Thoroughly drying each dye composition can facilitate the prevention of scumming, the setoff of dye ink during winding, and retransfer of the setoff dye ink to a coloring material layer with a different hue during rewinding.

The amount of the dye composition to be applied can be such that the thickness after drying the coloring material layer ranges from 0.1 to 5 μm, from the perspective of transferability.

A first thermal transfer recording sheet may be produced by any method, for example, by the following method.

First, the first compound represented by one of the general formulae (1) to (3), a dye (coloring material) represented by one of the general formulae (4) to (18) corresponding to the color of the target coloring material layer, and optionally a binder resin, a surfactant, and a wax are gradually added to and blended with a medium (for example, an organic solvent) while stirring.

Stable dissolution or fine dispersion of these components in the medium under mechanical shear force with a dispersing apparatus produces a dye composition (ink). The dye composition is applied to a base film substrate and is dried to form a target coloring material layer. Three (yellow, magenta, and cyan) coloring material layers are frame-sequentially formed on the substrate using three dye compositions produced by this method.

The dispersing apparatus used to prepare the dye compositions may be, but is not limited to, a media dispersing apparatus, such as a rotational shear homogenizer, a ball mill, a sand mill, or an attritor, or a high-pressure counter collision dispersing apparatus.

If necessary, another layer, such as the black coloring material layer and/or the transferable protective layer, may be formed to produce the thermal transfer recording sheet.

A thermal transfer recording sheet according to the present disclosure is not limited to a thermal transfer recording sheet produced by this production method.

(I-5) Method for Using Thermal Transfer Recording Sheet

A thermal transfer recording sheet is placed on a member to be transferred, for example, a receiver sheet having a coloring material receiving layer on its surface and is heated, for example, with a thermal head to transfer coloring materials from the thermal transfer recording sheet to the receiver sheet, thereby forming an image. When the first thermal transfer recording sheet has the transferable protective layer, a sheet of this protective layer portion is placed on an image formed on the receiver sheet and is heated, for example, with a thermal head to transfer (form) the protective layer onto the image.

A heating unit for heating a thermal transfer recording sheet for printing is not particularly limited and may utilize infrared light or a laser beam as well as a common thermal head. Using an electric heating film, which generates heat by supplying electricity to a base film substrate, a thermal transfer recording sheet may also be used as an electric dye transfer sheet.

EXAMPLES

Although the present disclosure is further described in the following exemplary embodiments and comparative examples, the present disclosure is not limited to these exemplary embodiments. Unless otherwise specified, the term "part" is based on mass.

[First Compound Represented by One of General Formulae (1) to (3) According to Present Disclosure]

The first compound represented by one of the general formulae (1) to (3) was obtained from Tokyo Chemical Industry Co., Ltd., for example, or was synthesized by a known method. Compounds were identified with a $^1$H nuclear magnetic resonance spectrometer ($^1$H-NMR) (AVANCE-600 NMR spectrometer, manufactured by BRUKER) and a MALDI-TOF/MS (MALDI-TOF/MS ultraFleXtreme, manufactured by BRUKER).

[Comparative Compounds]

The following comparative compounds (1) to (7) were used as comparative compounds.

Comparative compound (1)

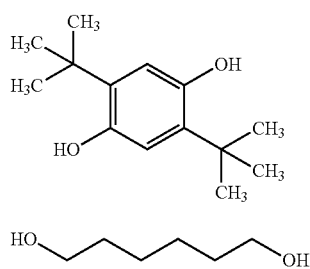

Comparative compound (2)

Comparative compound (3)

Comparative compound (4)

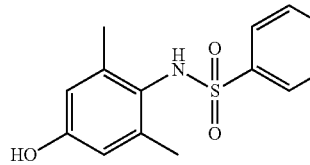

Comparative compound (5)

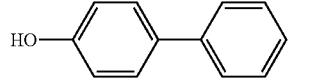

Comparative compound (6)

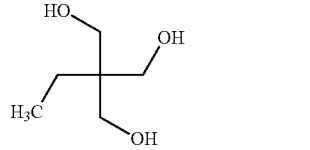

Comparative compound (7)

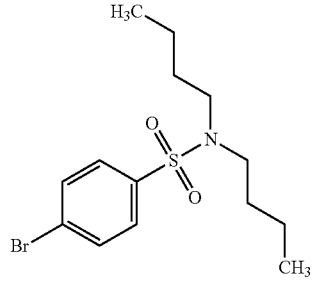

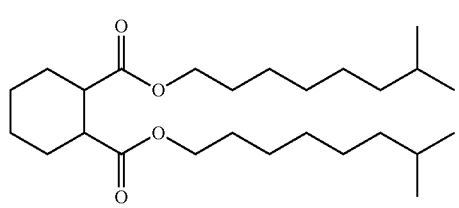

(I) Thermal Transfer Recording Sheet

[Preparation of Each Dye Composition]

<Preparation Example 1 of Yellow Dye Composition>

Five parts of a poly(vinyl butyral) resin (trade name: KS-3, manufactured by Sekisui Chemical Co., Ltd.) was added little by little to and dissolved in a mixed solution of 45 parts of methyl ethyl ketone and 45 parts of toluene. The following compounds were added to and completely dissolved in the solution to prepare a yellow dye composition (yellow ink) (Y1) for use in the formation of a thermal transfer recording sheet.

| First compound: | |
|---|---|
| A compound (A8) | 0.5 parts |
| yellow dyes: | |
| A compound represented by the general formula (4): compound (4-3) | 1.25 parts |
| A compound represented by the general formula (5): compound (5-1) | 2.50 parts |
| A compound represented by the general formula (18): compound (18-2) | 1.25 parts |

<Preparation Examples 2 to 17 of Yellow Dye Composition>

Yellow dye compositions (Y2) to (Y17) for use in the formation of a thermal transfer recording sheet were prepared in the same manner as in the preparation example 1 of the yellow dye composition except that the first compound and the yellow dyes in the preparation example 1 were changed to the compounds at the blend ratios listed in Table 1.

The blend ratio of the yellow dyes in Table 1 is the blend ratio of the compound represented by the general formula (4):the compound represented by the general formula (5):the compound represented by the general formula (6):the compound represented by the general formula (7):the compound represented by the general formula (18). In the yellow dye compositions (Y1) to (Y17), the total amount of yellow dyes used was 5 parts.

TABLE 1

| | Yellow dye general formula (4) | Yellow dye general formula (5) | Yellow dye general formula (6) | Yellow dye general formula (7) | Yellow dye general formula (18) | First compound | Blend ratio |
|---|---|---|---|---|---|---|---|
| Y1 | Compound (4-3) | Compound (5-1) | | | Compound (18-2) | Compound (A8) | 1:2:0:0:1:0.5 |
| Y2 | Compound (4-3) | Compound (5-2) | Compound (6-4) | | Compound (18-2) | Compound (A10) | 1:1:2:0:1:0.5 |
| Y3 | | Compound (5-1) | Compound (6-5) | | Compound (18-1) | Compound (A13) | 0:2:2:0:1:0.5 |
| Y4 | Compound (4-5) | Compound (5-1) | | | Compound (18-2) | Compound (A16) | 1:2:0:0:1:0.5 |
| Y5 | Compound (4-3) | Compound (5-4) | | Compound (7-4) | Compound (18-2) | Compound (A18) | 1:1:0:1:1:0.5 |

TABLE 1-continued

| | Yellow dye general formula (4) | Yellow dye general formula (5) | Yellow dye general formula (6) | Yellow dye general formula (7) | Yellow dye general formula (18) | First compound | Blend ratio |
|---|---|---|---|---|---|---|---|
| Y6 | | Compound (5-2) | Compound (6-3) | Compound (7-4) | Compound (18-1) | Compound (B4) | 0:2:1:1:1:0.5 |
| Y7 | Compound (4-6) | | Compound (6-4) | | Compound (18-2) | Compound (B11) | 2:0:2:0:1:0.5 |
| Y8 | | Compound (5-4) | | Compound (7-4) | Compound (18-2) | Compound (B14) | 0:2:0:2:1:0.5 |
| Y9 | Compound (4-3) | Compound (5-1) | | Compound (7-4) | | Compound (C5) | 1:2:0:1:0:0:5 |
| Y10 | | Compound (5-4) | | Compound (7-5) | Compound (18-1) | Compound (C20) | 0:2:0:2:1:0.5 |
| Y11 | Compound (4-3) | Compound (5-4) | | | Compound (18-2) | Comparative Compound (1) | 1:2:0:0:1:0.5 |
| Y12 | Compound (4-3) | Compound (5-1) | Compound (6-5) | | Compound (18-1) | Comparative Compound (1) | 1:1:2:0:1:0.5 |
| Y13 | Compound (4-3) | Compound (5-4) | | | Compound (18-2) | Comparative Compound (2) | 1:2:0:0:1:0.5 |
| Y14 | Compound (4-6) | | Compound (6-4) | | Compound (18-1) | Comparative Compound (3) | 2:0:2:0:1:0.5 |
| Y15 | | Compound (5-1) | Compound (6-5) | | Compound (18-2) | | 0:2:2:0:1:0 |
| Y16 | | Compound (5-2) | Compound (6-4) | Compound (7-5) | Compound (18-2) | | 0:2:1:1:1:0 |
| Y17 | Compound (4-6) | | Compound (6-4) | | Compound (18-1) | | 2:0:2:0:1:0 |

<Preparation Examples 1 to 30 of Cyan Dye Composition>

Cyan dye compositions (cyan inks) (C1) to (C30) for use in the formation of a thermal transfer recording sheet were prepared in the same manner as in the preparation example 1 of the yellow dye composition except that the first compound and the yellow dye in the preparation example 1 were changed to the compounds at the blend ratios listed in Table 2. The blend ratio of the cyan dyes in Table 2 is the blend ratio of the compound represented by the general formula (8):the compound represented by the general formula (9):the compound represented by the general formula (10):the compound represented by the general formula (11). In the cyan dye compositions (C1) to (C30), the total amount of cyan dyes used was 5 parts.

TABLE 2

| | Cyan dye general formula (8) | Cyan dye general formula (9) | Cyan dye general formula (10) | Cyan dye general formula (11) | First compound | Blend ratio |
|---|---|---|---|---|---|---|
| C1 | Compound (8-2) | Compound (9-3) | | | Compound (A8) | 3:2:0:0:0.5 |
| C2 | Compound (8-2) | Compound (9-3) | Compound (10-2) | | Compound (A10) | 2:2:1:0:0.5 |
| C3 | Compound (8-3) | Compound (9-4) | Compound (10-1) | | Compound (A13) | 2:2:1:0:0.5 |
| C4 | Compound (8-2) | Compound (9-3) | | | Compound (A16) | 2:3:0:0:0.5 |
| C5 | Compound (8-2) | Compound (9-2) | | | Compound (A18) | 2:3:0:0:0.5 |
| C6 | Compound (8-3) | Compound (9-4) | Compound (10-4) | | Compound (B4) | 1:1:1:0:0.3 |
| C7 | Compound (8-1) | Compound (9-3) | Compound (10-1) | | Compound (B5) | 2:2:1:0:0.5 |
| C8 | | Compound (9-2) | | Compound (11-6) | Compound (B11) | 0:3:0:1:0.5 |
| C9 | Compound (8-2) | Compound (9-2) | | | Compound (B14) | 2:3:0:0:0.5 |
| C10 | | Compound (9-3) | | Compound (11-1) | Compound (B16) | 0:2:0:1:0.5 |
| C11 | Compound (8-2) | | Compound (10-3) | | Compound (C5) | 2:0:1:0:0.5 |
| C12 | Compound (8-2) | Compound (9-3) | | Compound (11-7) | Compound (C20) | 1:3:0:1:0.5 |
| C13 | Compound (8-2) | Compound (9-3) | | | Comparative Compound (1) | 3:2:0:0:0.5 |
| C14 | Compound (8-3) | | Compound (10-1) | | Comparative Compound (2) | 3:0:1:0:0.5 |
| C15 | Compound (8-1) | Compound (9-4) | | | Comparative Compound (3) | 2:2:0:0:0.5 |
| C16 | Compound (8-2) | Compound (9-2) | Compound (10-1) | | Comparative Compound (4) | 2:2:1:0:0.5 |
| C17 | | Compound (9-3) | | Compound (11-1) | Comparative Compound (5) | 0.3.0.1.0.5 |
| C18 | Compound (8-1) | | Compound (10-1) | | Comparative Compound (6) | 3:0:1:0:0.5 |
| C19 | Compound (8-3) | Compound (9-2) | | | Comparative Compound (7) | 2:3:0:0:0.5 |
| C20 | Compound (8-1) | Compound (9-3) | Compound (10-1) | | | 2:2:1:0:0 |
| C21 | Compound (8-3) | Compound (9-4) | Compound (10-4) | | Compound (B23) | 1:1:1:0:0.2 |
| C22 | Compound (8-1) | Compound (9-3) | Compound (10-1) | | Compound (B23) | 2:2:1:0:0.4 |
| C23 | Compound (8-3) | Compound (9-4) | Compound (10-4) | | Compound B24) | 1:1:1:0:0.4 |

TABLE 2-continued

|   | Cyan dye general formula (8) | Cyan dye general formula (9) | Cyan dye general formula (10) | Cyan dye general formula (11) | First compound | Blend ratio |
|---|---|---|---|---|---|---|
| C24 | Compound (8-1) | Compound (9-3) | Compound (10-1) | | Compound (B24) | 2:2:1:0:0.4 |
| C25 | Compound (8-3) | Compound (9-4) | Compound (10-4) | | Compound (B25) | 1:1:1:0:0.3 |
| C26 | Compound (8-1) | Compound (9-3) | Compound (10-1) | | Compound (B25) | 2:2:1:0:0.5 |
| C27 | Compound (8-3) | Compound (9-4) | Compound (10-4) | | Compound (B26) | 1:1:1:0:0.2 |
| C28 | Compound (8-1) | Compound (9-3) | Compound (10-1) | | Compound (B26) | 2:2:1:0:0.5 |
| C29 | Compound (8-3) | Compound (9-4) | Compound (10-4) | | Compound B27) | 1:1:1:0:0.3 |
| C30 | Compound (8-1) | Compound (9-3) | Compound (10-1) | | Compound (B27) | 2:2:1:0:0.5 |

<Preparation Examples 1 to 16 of Magenta Dye Composition>

Magenta dye compositions (magenta inks) (M1) to (M16) for use in the formation of a thermal transfer recording sheet were prepared in the same manner as in the preparation example 1 of the yellow dye composition except that the first compound and the yellow dye in the preparation example 1 were changed to the compounds at the blend ratios listed in Table 3. The blend ratio of the magenta dyes in Table 3 is the blend ratio of the compound represented by the general formula (12): the the compound represented by the general formula (13):the general formula (14):the compound represented by the general formula (15):the compound represented by the general formula (16):the compound represented by the general formula (17). In the magenta dye compositions (M1) to (M16), the total amount of magenta dyes used was 5 parts.

[Preparation of Image Samples]

Exemplary Embodiment 1

A poly(ethylene terephthalate) film (trade name: Lumirror, manufactured by Toray Industries, Inc.) 4.5 µm in thickness was used as a substrate. The yellow dye composition (Y15) for use in the formation of a thermal transfer recording sheet was applied to the substrate such that the thickness after drying was 1 µm, and was dried to form a yellow coloring material layer.

A magenta coloring material layer was then formed adjacent to the yellow coloring material layer in the same manner as the yellow coloring material layer except that the yellow dye composition (Y15) was replaced with the magenta dye composition (M15).

TABLE 3

|   | Magenta dye general formula (12) | Magenta dye general formula (13) | Magenta dye general formula (14) | Magenta dye general formula (15) | Magenta dye general formula (16) | Magenta dye general formula (17) | First compound | Blend ratio |
|---|---|---|---|---|---|---|---|---|
| M1 | Compound (12-1) | Compound (13-3) | | | Compound (16-1) | | Compound (A8) | 2:2:0:0:1:0:0.5 |
| M2 | Compound (12-3) | Compound (13-7) | Compound (14-4) | | | Compound (17-5) | Compound (A10) | 2:2:1:0:0:1:0.5 |
| M3 | Compound (12-1) | Compound (13-3) | | | Compound (16-3) | | Compound (A13) | 1:1:0:0:2:0:0.4 |
| M4 | Compound (12-1) | Compound (13-7) | | | Compound (16-1) | | Compound (A16) | 2:2:0:0:1:0:0.5 |
| M5 | Compound (12-3) | Compound (13-3) | | Compound (15-3) | | | Compound (A18) | 2:2:0:1:0:0:0.5 |
| M6 | Compound (12-1) | Compound (13-3) | | | Compound (16-1) | | Compound (B4) | 1:1:0:0:3:0:0.5 |
| M7 | Compound (12-3) | Compound (13-3) | | Compound (15-3) | | | Compound (B11) | 2:2:0:1:0:0:0.5 |
| M8 | | Compound (13-3) | | | Compound (16-3) | Compound (17-2) | Compound (A10) | 0:2:0:0:1:1:0.4 |
| M9 | Compound (12-1) | Compound (13-3) | | | Compound (16-7) | | Compound (B14) | 2:2:0:0:1:0:0.5 |
| M10 | Compound (12-1) | | Compound (14-4) | | | Compound (17-5) | Compound (C5) | 2:0:1:0:0:1:0.5 |
| M11 | Compound (12-3) | Compound (13-3) | | | | Compound (17-5) | Compound (C20) | 2:2:0:0:0:1:0.5 |
| M12 | Compound (12-1) | Compound (13-8) | | | Compound (16-1) | | Comparative Compound (1) | 2:2:0:0:1:0:0.5 |
| M13 | | Compound (13-3) | | | Compound (16-1) | Compound (17-2) | Comparative Compound (2) | 0:2:0:0:2:1:0.5 |
| M14 | Compound (12-1) | Compound (13-3) | | | | Compound (17-5) | Comparative Compound (3) | 1:2:0:0:0:1:0.5 |
| M15 | Compound (12-1) | Compound (13-7) | | Compound (15-5) | Compound (16-1) | | | 1:1:0:1:1:0:0 |
| M16 | Compound (12-1) | Compound (13-8) | | | Compound (16-7) | | | 2:2:0:0:1:0:0 |

Likewise, a cyan coloring material layer was formed of the cyan dye composition (C1) adjacent to the magenta coloring material layer. A thermal transfer recording sheet thus formed included the yellow coloring material layer, the magenta coloring material layer, and the cyan coloring material layer.

Using the thermal transfer recording sheet including the yellow coloring material layer, the magenta coloring material layer, and the cyan coloring material layer, an image was transferred to photographic paper with a modification (the heat quantity to be supplied for thermal transfer was decreased to approximately 80%) of Selphy (trade name) manufactured by CANON KABUSHIKI KAISHA, thereby preparing an image sample (1). The yellow, magenta, and cyan inks were applied in this order at the same output to print a black image as the image sample. The image sample was examined as described below. The color of the image sample was measured with a reflection densitometer FD-7 (trade name, manufactured by Konica Minolta, Inc.).

Exemplary Embodiments 2 to 43 and Comparative Examples 1 to 14

A thermal transfer recording sheet including a yellow coloring material layer, a magenta coloring material layer, and a cyan coloring material layer was formed in the same manner as in Exemplary Embodiment 1 except that each color dye composition (ink) to be used was changed as listed in Tables 4-1 and 4-2. Image samples 2 to 43 and comparative image samples 1 to 14 were outputted in the same manner as in Exemplary Embodiment 1 and were examined as described below.

TABLE 4-1

| Image | Dye composition | | |
|---|---|---|---|
| sample name | Yellow | Magenta | Cyan |
| Example 1 | Sample 1 | Y15 | M15 | C1 |
| Example 2 | Sample 2 | Y16 | M16 | C2 |
| Example 3 | Sample 3 | Y15 | M16 | C3 |
| Example 4 | Sample 4 | Y17 | M16 | C4 |
| Example 5 | Sample 5 | Y17 | M16 | C5 |
| Example 6 | Sample 6 | Y16 | M16 | C6 |
| Example 7 | Sample 7 | Y15 | M15 | C7 |
| Example 8 | Sample 8 | Y15 | M16 | C8 |
| Example 9 | Sample 9 | Y17 | M16 | C9 |
| Example 10 | Sample 10 | Y17 | M16 | C10 |
| Example 11 | Sample 11 | Y16 | M15 | C11 |
| Example 12 | Sample 12 | Y15 | M16 | C12 |
| Example 13 | Sample 13 | Y1 | M15 | C20 |
| Example 14 | Sample 14 | Y2 | M16 | C20 |
| Example 15 | Sample 15 | Y3 | M16 | C20 |
| Example 16 | Sample 16 | Y4 | M16 | C20 |
| Example 17 | Sample 17 | Y5 | M16 | C20 |
| Example 18 | Sample 18 | Y6 | M16 | C20 |
| Example 19 | Sample 19 | Y7 | M15 | C20 |
| Example 20 | Sample 20 | Y8 | M15 | C20 |
| Example 21 | Sample 21 | Y9 | M16 | C20 |
| Example 22 | Sample 22 | Y10 | M16 | C20 |
| Example 23 | Sample 23 | Y15 | M1 | C20 |
| Example 24 | Sample 24 | Y16 | M2 | C20 |
| Example 25 | Sample 25 | Y15 | M3 | C20 |
| Example 26 | Sample 26 | Y16 | M4 | C20 |
| Example 27 | Sample 27 | Y15 | M5 | C20 |
| Example 28 | Sample 28 | Y17 | M6 | C20 |
| Example 29 | Sample 29 | Y15 | M7 | C20 |
| Example 30 | Sample 30 | Y15 | M9 | C20 |
| Example 31 | Sample 31 | Y15 | M10 | C20 |
| Example 32 | Sample 32 | Y16 | M11 | C20 |
| Example 33 | Sample 33 | Y16 | M2 | C7 |
| Example 34 | Sample 34 | Y16 | M16 | C21 |
| Example 35 | Sample 35 | Y16 | M16 | C22 |

TABLE 4-1-continued

| Image | Dye composition | | |
|---|---|---|---|
| sample name | Yellow | Magenta | Cyan |
| Example 36 | Sample 36 | Y16 | M16 | C23 |
| Example 37 | Sample 37 | Y16 | M16 | C24 |
| Example 38 | Sample 38 | Y16 | M16 | C25 |
| Example 39 | Sample 39 | Y16 | M16 | C26 |
| Example 40 | Sample 40 | Y16 | M16 | C27 |
| Example 41 | Sample 41 | Y16 | M16 | C28 |
| Example 42 | Sample 42 | Y16 | M16 | C29 |
| Example 43 | Sample 43 | Y16 | M16 | C30 |

TABLE 4-2

| | | Dye composition | | |
|---|---|---|---|---|
| | Image sample name | Yellow | Magenta | Cyan |
| Comparative example 1 | Comparative sample 1 | Y11 | M16 | C20 |
| Comparative example 2 | Comparative sample 2 | Y13 | M15 | C20 |
| Comparative example 3 | Comparative sample 3 | Y14 | M15 | C20 |
| Comparative example 4 | Comparative sample 4 | Y15 | M12 | C20 |
| Comparative example 5 | Comparative sample 5 | Y17 | M13 | C20 |
| Comparative example 6 | Comparative sample 6 | Y12 | M14 | C20 |
| Comparative example 7 | Comparative sample 7 | Y16 | M16 | C13 |
| Comparative example 8 | Comparative sample 8 | Y15 | M16 | C14 |
| Comparative example 9 | Comparative sample 9 | Y17 | M16 | C15 |
| Comparative example 10 | Comparative sample 10 | Y2 | M14 | C16 |
| Comparative example 11 | Comparative sample 11 | Y1 | M13 | C17 |
| Comparative example 12 | Comparative sample 12 | Y2 | M14 | C18 |
| Comparative example 13 | Comparative sample 13 | Y3 | M16 | C19 |
| Comparative example 14 | Comparative sample 14 | Y15 | M16 | C20 |

[Evaluation]
<Density Evaluation>

The optical density (O.D.) of the black image printed as described above was measured and rated according to the following criteria. Tables 5-1 and 5-2 list the values and ratings.

A (very high density): 0.9≤O.D.
B (high density): 0.8≤O.D.<0.9
C (low density): O.D.<0.8

<Evaluation of Imbalance>

The image samples according to Exemplary Embodiments 1 to 33 and Comparative Examples 1 to 14 were exposed for 30 hours in a xenon test apparatus (trade name: Atlas Ci4000, manufactured by Suga Test Instruments Co., Ltd.) at an illuminance of 0.28 W/m² at 340 nm, at a temperature of 40° C., and at a relative humidity of 50%.

The O.D. residual ratio was defined by the following formula, wherein $OD_0$ denotes the initial optical density (O.D.), and $OD_{30}$ denotes O.D. after 30-hour exposure.

$$O.D. \text{ residual ratio} = 100 \times (OD_{30}/OD_0)$$

The OD residual ratio of each component of cyan, magenta, and yellow in the black image was calculated using the formula. An absolute difference between O.D. residual ratios was calculated as an imbalance as described below.

$$Bk_{C-Y} = |(O.D. \text{ residual ratio of yellow component}) - (O.D. \text{ residual ratio of cyan component})|$$

$$Bk_{M-Y} = |(O.D. \text{ residual ratio of yellow component}) - (O.D. \text{ residual ratio of magenta component})|$$

$$Bk_{C-M} = |(O.D. \text{ residual ratio of cyan component}) - (O.D. \text{ residual ratio of magenta component})|$$

The three values ($Bk_{C-Y}$, $Bk_{M-Y}$, and $Bk_{C-M}$) calculated using these formulae were rated according to the following criteria. Tables 5-1 and 5-2 list these values and ratings.

A (very good imbalance): $(Bk_{C-Y}, Bk_{M-Y}, \text{and } Bk_{C-M}) < 10$
B (good imbalance): $10 \leq (Bk_{C-Y}, Bk_{M-Y}, \text{and } Bk_{C-M}) \leq 15$
C (poor imbalance): $15 < (Bk_{C-Y}, Bk_{M-Y}, \text{and } Bk_{C-M})$ <Evaluation of Storage Stability of Image>

The images according to the exemplary embodiments were stored at a temperature of 60° C. for one month and were visually inspected for blurring after the storage. Tables 5-1 and 5-2 show the results.

The following are evaluation criteria.

A (very high storage stability): Little blurring was observed in the image.

B (high storage stability): A little blurring was observed in the image.

C (poor storage stability): Much blurring was observed in the image.

TABLE 5-1

| | Image sample name | Evaluation of density Bk O.D. | Rating | Bk (C-M) Value | Rating | Bk (C-Y) Value | Rating | Bk (M-Y) Value | Rating | Evaluation of storage stability |
|---|---|---|---|---|---|---|---|---|---|---|
| Example 1 | Sample 1 | 0.98 | A | 4 | A | 6 | A | 2 | A | A |
| Example 2 | Sample 2 | 1.01 | A | 3 | A | 4 | A | 1 | A | A |
| Example 3 | Sample 3 | 0.98 | A | 3 | A | 7 | A | 4 | A | A |
| Example 4 | Sample 4 | 0.99 | A | 2 | A | 5 | A | 3 | A | A |
| Example 5 | Sample 5 | 0.90 | A | 3 | A | 5 | A | 2 | A | A |
| Example 6 | Sample 6 | 1.28 | A | 1 | A | 4 | A | 3 | A | A |
| Example 7 | Sample 7 | 1.31 | A | 1 | A | 3 | A | 2 | A | A |
| Example 8 | Sample 8 | 0.97 | A | 3 | A | 6 | A | 3 | A | A |
| Example 9 | Sample 9 | 1.01 | A | 7 | A | 11 | B | 4 | A | A |
| Example 10 | Sample 10 | 1.03 | A | 5 | A | 8 | A | 3 | A | A |
| Example 11 | Sample 11 | 0.94 | A | 7 | A | 10 | B | 3 | A | A |
| Example 12 | Sample 12 | 0.94 | A | 8 | A | 9 | A | 1 | A | A |
| Example 13 | Sample 13 | 0.98 | A | 9 | A | 12 | B | 3 | A | A |
| Example 14 | Sample 14 | 0.99 | A | 7 | A | 10 | B | 3 | A | A |
| Example 15 | Sample 15 | 0.95 | A | 13 | B | 14 | B | 1 | A | A |
| Example 16 | Sample 16 | 0.92 | A | 8 | A | 10 | B | 2 | A | A |
| Example 17 | Sample 17 | 0.91 | A | 9 | A | 10 | B | 1 | A | A |
| Example 18 | Sample 18 | 1.02 | A | 8 | A | 12 | B | 4 | A | A |
| Example 19 | Sample 19 | 1.03 | A | 14 | B | 15 | B | 1 | A | A |
| Example 20 | Sample 20 | 0.94 | A | 13 | B | 15 | B | 2 | A | A |
| Example 21 | Sample 21 | 0.92 | A | 14 | B | 15 | B | 1 | A | A |
| Example 22 | Sample 22 | 0.90 | A | 12 | B | 14 | B | 2 | A | A |
| Example 23 | Sample 23 | 1.01 | A | 3 | A | 8 | A | 5 | A | A |
| Example 24 | Sample 24 | 1.03 | A | 5 | A | 9 | A | 4 | A | A |
| Example 25 | Sample 25 | 0.98 | A | 8 | A | 9 | A | 1 | A | A |
| Example 26 | Sample 26 | 0.96 | A | 5 | A | 8 | A | 3 | A | A |
| Example 27 | Sample 27 | 0.92 | A | 5 | A | 7 | A | 2 | A | A |
| Example 28 | Sample 28 | 1.08 | A | 4 | A | 7 | A | 3 | A | A |
| Example 29 | Sample 29 | 1.12 | A | 8 | A | 9 | A | 1 | A | A |
| Example 30 | Sample 30 | 1.01 | A | 9 | A | 13 | B | 4 | A | A |
| Example 31 | Sample 31 | 0.96 | A | 5 | A | 9 | A | 4 | A | A |
| Example 32 | Sample 32 | 0.94 | A | 9 | A | 11 | B | 2 | A | A |
| Example 33 | Sample 33 | 1.32 | A | 1 | A | 5 | A | 4 | A | A |
| Example 34 | Sample 34 | 1.28 | A | 1 | A | 4 | A | 3 | A | A |
| Example 35 | Sample 35 | 1.31 | A | 1 | A | 3 | A | 2 | A | A |
| Example 36 | Sample 36 | 1.28 | A | 1 | A | 4 | A | 3 | A | A |
| Example 37 | Sample 37 | 1.31 | A | 1 | A | 3 | A | 2 | A | A |
| Example 38 | Sample 38 | 1.28 | A | 1 | A | 4 | A | 3 | A | A |
| Example 39 | Sample 39 | 1.31 | A | 1 | A | 3 | A | 2 | A | A |
| Example 40 | Sample 40 | 1.28 | A | 1 | A | 4 | A | 3 | A | A |
| Example 41 | Sample 41 | 1.28 | A | 1 | A | 3 | A | 2 | A | A |
| Example 42 | Sample 42 | 1.28 | A | 1 | A | 4 | A | 3 | A | A |
| Example 43 | Sample 43 | 1.32 | A | 1 | A | 3 | A | 2 | A | A |

TABLE 5-2

| | Image sample name | Evaluation of density Bk O.D. | Rating | Bk (C-M) Value | Rating | Bk (C-Y) Value | Rating | Bk (M-Y) Value | Rating | Evaluation of storage stability |
|---|---|---|---|---|---|---|---|---|---|---|
| Comparative example 1 | Comparative sample 1 | 0.77 | C | 25 | C | 29 | C | 4 | A | C |
| Comparative example 2 | Comparative sample 2 | 0.76 | C | 40 | C | 43 | C | 3 | A | C |
| Comparative example 3 | Comparative sample 3 | 0.74 | C | 36 | C | 40 | C | 4 | A | C |
| Comparative example 4 | Comparative sample 4 | 0.82 | B | 24 | C | 26 | C | 2 | A | C |

TABLE 5-2-continued

| Image sample name | Evaluation of density Bk O.D. | Rating | Bk (C-M) Value | Rating | Bk (C-Y) Value | Rating | Bk (M-Y) Value | Rating | Evaluation of storage stability |
|---|---|---|---|---|---|---|---|---|---|
| Comparative example 5 | Comparative sample 5 | 0.85 | B | 38 | C | 42 | C | 4 | A | C |
| Comparative example 6 | Comparative sample 6 | 0.58 | C | 31 | C | 40 | C | 9 | A | C |
| Comparative example 7 | Comparative sample 7 | 0.81 | B | 21 | C | 23 | C | 2 | A | C |
| Comparative example 8 | Comparative sample 8 | 0.72 | C | 39 | C | 40 | C | 1 | A | C |
| Comparative example 9 | Comparative sample 9 | 0.78 | C | 33 | C | 38 | C | 5 | A | C |
| Comparative example 10 | Comparative sample 10 | 0.85 | B | 30 | C | 31 | C | 1 | A | C |
| Comparative example 11 | Comparative sample 11 | 0.66 | C | 33 | C | 35 | C | 2 | A | C |
| Comparative example 12 | Comparative sample 12 | 0.79 | C | 38 | C | 41 | C | 3 | A | C |
| Comparative example 13 | Comparative sample 13 | 0.55 | C | 36 | C | 38 | C | 2 | A | C |
| Comparative example 14 | Comparative sample 14 | 0.87 | B | 35 | C | 38 | C | 3 | A | B |

Tables 5-1 and 5-2 show that the image samples formed by using the thermal transfer recording sheets according to the exemplary embodiments had higher density, better imbalance, and higher long-term storage stability under low-energy conditions than the image samples formed by using the thermal transfer recording sheets according to the comparative examples.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A thermal transfer recording sheet comprising:
   a substrate; and
   a yellow coloring material layer containing a yellow dye, a magenta coloring material layer containing a magenta dye, and a cyan coloring material layer containing a cyan dye frame-sequentially formed on the substrate,
   wherein at least one coloring material layer selected from the group consisting of the yellow coloring material layer, the magenta coloring material layer, and the cyan coloring material layer contains at least one compound selected from the group consisting of the compound group represented by the following formulae (1) to (3), and
   a content of the at least one compound contained in a coloring material layer A, which is the at least one coloring material layer containing the at least one compound, ranges from 5 to 25 parts by mass per 100 parts by mass of dye contained in the coloring material layer A,

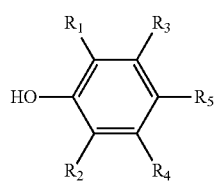

formula (1)

in the formula (1), $R_1$ denotes a hydrogen atom, an alkyl group having 1 to 4 carbon atoms, or a hydroxy group, $R_2$ to $R_4$ independently denote a hydrogen atom or an alkyl group having 1 to 4 carbon atoms, and $R_5$ denotes an alkyl group having 1 to 4 carbon atoms, a hydroxymethyl group, or an amino group, the compound group represented by the formula (1) consists of

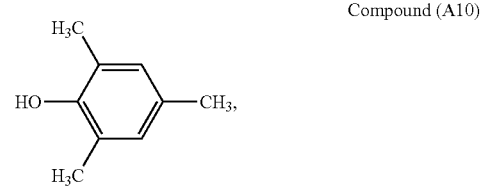

Compound (A10)

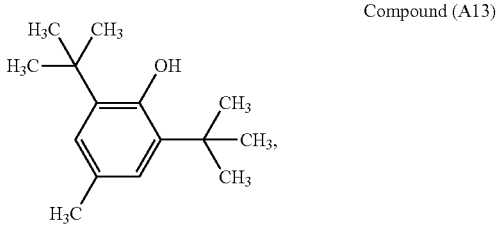

Compound (A13)

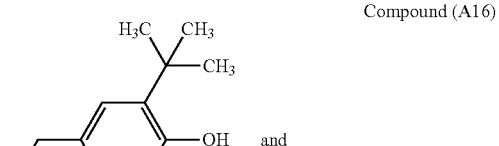

Compound (A16)

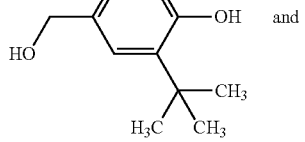 and

-continued

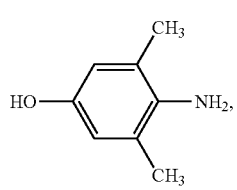

Compound (A18)

formula (2)

$$\text{HO}-\overset{R_6}{\underset{R_8}{\text{C}}}-R_7$$

in the formula (2),
$R_6$ denotes an alkyl group having 5 to 23 carbon atoms or a hydroxyalkyl group having 5 to 23 carbon atoms,
$R_7$ denotes a hydrogen atom, a hydroxy group, or a hydroxymethyl group, and
$R_8$ denotes a hydrogen atom or an alkyl group having 5 to 23 carbon atoms,
the compound group represented by the formula (2) consists of Compound (B11)

HO–CH(OH)–(CH2)4–CH3 ,

Compound (B14)

and

Compound (B16)

, formula (3)

$$\underset{R_{10}}{\overset{O}{\underset{\|}{\text{O}=\text{S}}}}-\underset{R_{11}}{\text{C}_6\text{H}_4}-R_9$$

in the formula (3),
$R_9$ denotes an alkyl group having 1 to 4 carbon atoms or an amino group, $R_{10}$ denotes a hydrogen atom or an alkyl group having 1 to 8 carbon atoms, and $R_{11}$ denotes an alkyl group having 1 to 8 carbon atoms, the yellow coloring material layer contains a compound selected from the group consisting of the compound group represented by the following formulae (4) to (7) and (18), as the yellow dye, the cyan coloring material layer contains a compound selected from the group consisting of the compound group represented by the following formulae (8) to (11), as the cyan dye, and the magenta coloring material layer contains a compound selected from the group consisting of the compound group represented by the following formulae (12) to (17), as the magenta dye,

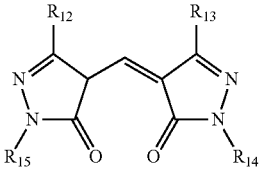

formula (4)

in the formula (4), $R_{12}$ to $R_{15}$ independently denote an alkyl group, an unsubstituted aryl group, or an aryl group with a substituent,

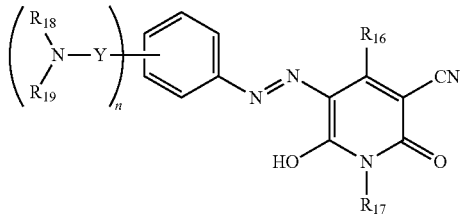

formula (5)

in the formula (5), $R_{16}$ denotes an alkyl group, an unsubstituted aryl group, an aryl group with a substituent, an unsubstituted amino group, or an amino group with a substituent, $R_{17}$ denotes a hydrogen atom, an alkyl group, an unsubstituted aryl group, an aryl group with a substituent, or $-N(-R_a)R_b$, and $R_a$ and $R_b$ satisfy the following (i) or (ii), (i) $R_a$ and $R_b$ independently denote a hydrogen atom, an alkyl group, or an acyl group, (ii) $R_a$ and $R_b$ are bonded together and form a ring, and $R_a$ and $R_b$ denote an atomic group required to form the ring, $R_{18}$ denotes an alkyl group, $R_{19}$ denotes a hydrogen atom or an alkyl group, Y denotes a carbonyl group or a sulfonyl group, and n denotes an integer in the range of 1 to 3, formula (6)

in the formula (6), $R_{20}$ and $R_{21}$ independently denote an alkyl group or an aryl group, formula (7)

in the formula (7), $R_{22}$ and $R_{23}$ independently denote an alkyl group or an aryl group, formula (8)

in the formula (8), $R_{24}$ to $R_{28}$ independently denote an alkyl group or an aryl group, formula (9)

in the formula (9), $R_{29}$ and $R_{30}$ independently denote an alkyl group, an unsubstituted aryl group, or an aryl group with a substituent, formula (10)

in the formula (10), $R_{31}$ to $R_{35}$ independently denote an alkyl group, a benzyl group, or an aryl group, formula (11)

in the formula (11), $R_{36}$ to $R_{39}$ independently denote a hydrogen atom, an alkyl group, an unsubstituted aryl group, an aryl group with a substituent, or a benzyl group, $R_{40}$ and $R_{41}$ independently denote an alkyl group, $R_{42}$ denotes an unsubstituted aryl group or an aryl group with a substituent, and $X^-$ denotes an anion, formula (12)

in the formula (12), $R_{43}$ denotes an unsubstituted alkyl group, an alkyl group in which methylenes are partly substituted with oxygen, an unsubstituted aryl group, or an aryl group with a substituent, formula (13)

in the formula (13), $R_{44}$ and $R_{45}$ independently denote an alkyl group, an unsubstituted aryl group, or an aryl group with a substituent, formula (14)

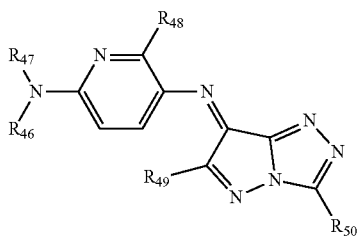

in the formula (14), $R_{46}$ to $R_{50}$ independently denote an alkyl group, an unsubstituted aryl group, or an aryl group with a substituent, formula (15)

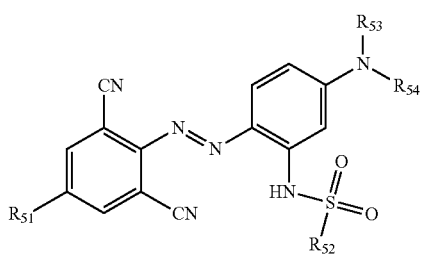

in the formula (15), $R_{51}$ to $R_{54}$ independently denote an alkyl group, an unsubstituted aryl group, or an aryl group with a substituent, formula (16)

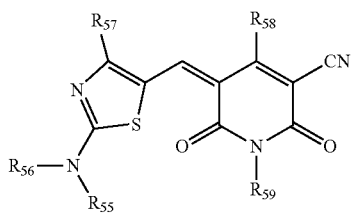

in the formula (16), $R_{55}$ and $R_{56}$ independently denote an alkyl group, $R_{57}$ denotes a hydrogen atom, an alkyl group, an unsubstituted aryl group, or an aryl group with a substituent, $R_{58}$ denotes an alkyl group, an unsubstituted aryl group, or an aryl group with a substituent, $R_{59}$ denotes a hydrogen atom, an alkyl group, an unsubstituted aryl group, an aryl group with a substituent, or —N(—$R_{60}$)$R_{61}$, and $R_{60}$ and $R_{61}$ satisfy the following (i) or (ii), (i) $R_{60}$ and $R_{61}$ independently denote a hydrogen atom, an alkyl group, an aryl group, or an acyl group,
(ii) $R_{60}$ and $R_{61}$ are bonded together and form a ring, and $R_{60}$ and $R_{61}$ denote an atomic group required to form the ring, formula (17)

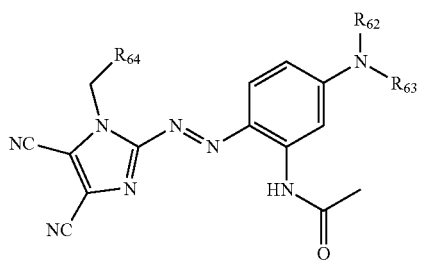

in the formula (17), $R_{62}$ and $R_{63}$ independently denote an alkyl group, and $R_{64}$ denotes an alkenyl group or a phenyl group, formula (18)

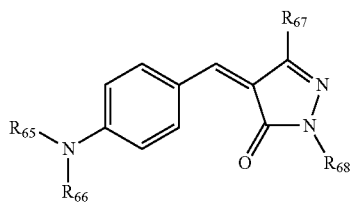

in the formula (18), $R_{65}$ and $R_{66}$ independently denote an alkyl group, $R_{67}$ denotes an alkyl group or an alkoxy group, and $R_{68}$ denotes an alkyl group or an aryl group.

2. The thermal transfer recording sheet according to claim 1, wherein
the cyan coloring material layer contains the at least one compound selected from the group consisting of the compound group represented by the formulae (1) to (3).

3. The thermal transfer recording sheet according to claim 1, wherein the compound represented by the formula (1) has a melting point in the range of 40° C. to 200° C.

4. The thermal transfer recording sheet according to claim 1, wherein the compound represented by the formula (2) has a melting point in the range of 0° C. to 100° C.

* * * * *